(12) United States Patent
Otokawa et al.

(10) Patent No.: US 7,604,706 B2
(45) Date of Patent: Oct. 20, 2009

(54) METHOD FOR PRODUCING RESIN-MOLDED SUBSTRATE AND METHOD FOR PRODUCING REVERSIBLE IMAGE DISPLAY MEDIUM

(75) Inventors: Kenji Otokawa, Sakai (JP); Denji Nota, Ashiya (JP); Akihito Ikegawa, Sakai (JP); Keyaki Yogome, Kyoto (JP); Takaji Kurita, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 88 days.

(21) Appl. No.: 10/109,553

(22) Filed: Mar. 29, 2002

(65) Prior Publication Data

US 2002/0185788 A1    Dec. 12, 2002

(30) Foreign Application Priority Data

Mar. 30, 2001 (JP) ............................. 2001-098932
Mar. 30, 2001 (JP) ............................. 2001-098939
Mar. 30, 2001 (JP) ............................. 2001-098951

(51) Int. Cl.
*G03G 7/00* (2006.01)
*B29C 59/04* (2006.01)

(52) U.S. Cl. .................... 156/209; 156/220; 156/292; 345/107

(58) Field of Classification Search ................ 347/112, 347/153; 345/107; 359/296; 156/292
See application file for complete search history.

(56) References Cited

U.S. PATENT DOCUMENTS 4,985,535 A * 1/1991 Takada et al. ............. 528/272
5,643,400 A * 7/1997 Bernard et al. ............ 156/500

(Continued)

FOREIGN PATENT DOCUMENTS

JP    60-244366    12/1985

(Continued)

OTHER PUBLICATIONS

Gugrae-Jo, et al *"Image Display Using Conductive Toner and Charge Transport Layer"* Japan Hardcopy, Jul. 21-29, 2001, Tokyo, Japan, pp. 249-252.

(Continued)

*Primary Examiner*—Richard Crispino
*Assistant Examiner*—Barbara J. Musser
(74) *Attorney, Agent, or Firm*—McDermott Will & Emery LLP

(57) ABSTRACT

An initial resin substrate is formed by laminating resin layers, and one surface of the initial substrate is heated and pressed by a molding die to mold a projected and dented surface such that substantially no deformation occurs on the resin layer providing a surface opposed to the one surface of the initial substrate. A reversible image display medium is produced by a method comprising the steps of accommodating a dry developer into the concavities and fixing a second substrate to the first substrate using an adhesive. Alternatively a reversible image display medium may be produced by, e.g., a method comprising the steps of providing a first substrate having one surface including concavities, spreading the dry developer over the one surface, removing the excess developer while accommodating the developer into the concavities, and fixing a second substrate to the one surface, or alternatively forming a cell sheet having the cells and accommodating a dry developer therein by use of supersonic oscillation, magnetic force or vacuum suction force.

5 Claims, 13 Drawing Sheets

U.S. PATENT DOCUMENTS

| | | | |
|---|---|---|---|
| 6,239,896 B1 * | 5/2001 | Ikeda | 359/240 |
| 6,407,763 B1 * | 6/2002 | Yamaguchi et al. | 347/112 |
| 6,787,015 B2 * | 9/2004 | Lackritz et al. | 204/451 |
| 6,930,818 B1 * | 8/2005 | Liang et al. | 359/296 |
| 2001/0024577 A1 * | 9/2001 | Matsuura et al. | 399/2 |
| 2002/0053399 A1 * | 5/2002 | Soane et al. | 156/292 |
| 2002/0126249 A1 * | 9/2002 | Liang et al. | 349/187 |

FOREIGN PATENT DOCUMENTS

| | | |
|---|---|---|
| JP | 61-134238 | 6/1986 |
| JP | 01-300231 | 12/1989 |
| JP | 06-314058 | 11/1994 |
| JP | 9-185087 | 7/1997 |
| JP | 10-326562 | 12/1998 |
| JP | 2000-10100 | 1/2000 |
| JP | 2000-47181 | 2/2000 |
| JP | 2000-82394 | 3/2000 |
| JP | 2000-147529 | 5/2000 |
| WO | WO 94/29400 | * 12/1994 |

OTHER PUBLICATIONS

Japanese Office Action, with English translation, issued in Japanese Patent Application No. JP 2001-098932, mailed Mar. 4, 2009.

* cited by examiner

METHOD FOR PRODUCING RESIN-MOLDED SUBSTRATE AND METHOD FOR PRODUCING REVERSIBLE IMAGE DISPLAY MEDIUM

CROSS-REFERENCE TO RELATED APPLICATION

This application is based on Japanese Patent applications No. 2001-98932, No. 2001-98939 and No. 2001-98951 filed in Japan on Mar. 30, 2001, respectively, the contents of which are hereby incorporated by reference.

BACKGROUND OF THE INVENTION

1. Field of the Invention

The present invention relates to a method for producing a resin-molded substrate and a method for producing a reversible(in other word, reusable) image display medium, in which image displaying and image erasing operations can be repeated.

2. Description of the Background Art

At present, image display is performed, e.g., in the following manners. A person uses a pencil, a pen, paints or the like, and manually writes or draws characters, pictures or the like on an image display medium such as paper sheet. Also, a computer, a word processor or the like is used to display text, graphics or the like on a display such as a CRT display, or output them on a medium such as a paper sheet via a printer for display.

A copying machine or the like may be used for producing duplication, on a medium of paper or the like, of the texts, pictures, graphics or the like, which are produced on the medium of paper or the like by a person or by a printer. A facsimile machine may be used for sending such contents (texts, pictures, graphics and others) prepared in the above manner for producing duplication on another medium of paper or the like.

The above image display, which is performed to display the texts, pictures or the like on the image display medium of paper or the like by a pencil, pen or the like, or by an image forming apparatus such as a printer, a copying machine or a facsimile machine operating in a electrophotographic method, an ink-jet method, a heat transfer method or the like, can achieve clear image display in a high resolution, and thus can achieve easy-on-the-eyes display.

However, it is impossible to repeat display and erasure of the images on the image display medium of paper or the like. In the case where the paper is used for writing characters or the like by a pencil, the characters can be erased by an eraser to a certain extent. However, it is difficult to erase completely the characters or the like written in an ordinary density, although it may be possible when written in a light density. The medium of paper or the like can not be reused except for the case of using the rear surface of the medium, which is not yet used for the image display.

Accordingly, the medium of paper or the like bearing images will be abandoned or burnt when it is not longer required. This results in consumption of a large mount of resources. The printer, copying machine or the like also consume consumable products or materials such as toner or ink. For obtaining the new display medium of paper or the like as well as toner, ink or the like, energies and resources are required for producing them. This is contrary to the current demand for reduction in environmental loads.

In contrast to the above, the image display by a display such as a CRT display can repeat the image display and the image erasure. However, the resolution, clarity and precision of images are restricted, as compared with the images displayed by the printer or the like on the paper medium or the like. Thus the image display by the display such as the CRT display is improper especially when used for displaying the text documents mainly composed of letters because of low resolution. If it is used for displaying sentences which continue in less than the frame-size volume, it will do. However, if the sentences continue in twice or more times the frame-size volume, they may be difficult to read and to understand. Due to the relatively low resolution and the light emission from the display, operations for a long time are likely to be hard to eyes.

Electrophoretic display (EPD) and Twist ball-type display (TBD) have been proposed as an image display method allowing repetition of the image display and image erasure. Further displaying method was recently proposed, which is disclosed in "Japan Hardcopy '99, the book of the thesis, pp. 249-252".

In the electrophoretic display method, two substrates including at least one transparent substrate are opposed together with a spacer therebetween to form a closed space therebetween, and the space is filled with a display liquid formed of a dispersion medium and electrophoretic particles, which are dispersed in the dispersion medium and are different in color from the medium. The image display is performed by an application of an electrostatic field and in a color of the particles or a color of the dispersion medium.

The display liquid is usually formed of isoparaffin-contained dispersion medium, particles of titanium dioxide or the like, dyes applying contrast in color to the particles, and an additive such as a surface active agent, or a charge applying agent.

In the electrophoretic display, the display is performed by utilizing contrast between particles of a high refractive index (e.g., titanium dioxide particles) and colored insulating liquid, and therefore the particles can not hide the colored liquid to a high extent, resulting in a low contrast.

Furthermore, there is a limitation on the kind of dye which is dissolved in a high concentration in a nonpolar solvent of high resistance which allows the electrophoresis of particles. A dye showing a white color is not found. Nor known is a black dye having a high extinction coefficient. Therefore the background portion becomes colored so that it is difficult to achieve a good contrast by a white background. When white particles for formation of images are placed into a colored liquid, the colored liquid may be moved between the substrate and the layer of white particles which are moved to the image observation side substrate, or the colored liquid may come into between the white particles, thereby lowering the contrast. The electrophoretic particles can scarcely uniformly adhere to the image observation side substrate, and thus the resolution is low.

Further, settling and condensation of particles are liable to occur due to a very large difference in specific gravity between the particles and the dispersion medium in the display liquid. This is liable to lower the display contrast. Further, it is difficult to display the images with high stability for a long time, and remaining of last images is liable to occur. Further, the degree of charging of the particles in the liquid significantly changes with time, which also impairs the stability of the image display.

In the twist ball-type display method, images can be displayed in specified colors using an image display medium containing numerous microcapsules enclosing not only an insulating liquid but also fine spheric particle so processed that a half of their surface and the other surface portion show colors or an optical density which differs from each other.

Images are displayed in predetermined colors by rotating the fine spheric particles in the microcapsules due to an electric field strength or magnetic strength.

However, according to the twist ball-type display, images are displayed using fine spherical particles in the insulating liquid within the microcapsules. This makes it difficult to attain good contrast. Further, the resolution is low since spaces are formed between the microcapsules. In the manufacture of microcapsules, difficulty is entailed in reducing the size of microcapsules to increase the resolution.

The "Japan Hardcopy '99, the book of the thesis, pp. 249-252" discloses an image displaying method wherein a closed space is formed by placing two substrates as opposed to each other and as spaced from each other, i.e. the two substrates being a laminate of electrodes and a charge transporting layer, the space being used to enclose the electrically conductive toner and insulating particles which are different in color from the toner, an electrostatic field being applied to inject charges into the electrically conductive toner so that the toner is moved by a Coulomb force applied thereto to display images.

However, the foregoing image displaying method utilizing the charge injection phenomenon poses problems. When the electrically conductive toner particles carrying the injected charges, are moved, insulating particles (e.g. white particles mixed together to form the color of background) interfere with the movement of the toner particles, making their movement so difficult that some of them may stop their movement. This results in failure to obtain satisfactory image density and good contrast and in reduction of image display rate. To overcome these problems, a high voltage drive is necessitated. The resolution is determined by the electrodes and is so limited. Furthermore, it is essential to use electrodes, charge-injection layer and electrically conductive toner, which results in limited manufacture.

A few of the present inventors have devised together with other inventors a reversible image display medium having a basic structure given below to overcome the foregoing problems. In contrast to such conventional image display mediums, the devised image display medium aims:

(1) to allow repeated image display and image erasure, and to reduce the consumption of image display mediums of paper or the like in the prior art and consumable materials such as developers and ink so that a current demand for reduction in environmental loads can be satisfied, (2) to perform image display in good contrast and therefore in high quality, (3) to perform image display in high resolution and therefore in high quality, (4) to achieve stable image display for a long time, (5) to suppress remaining of last images and therefore to exhibit good reversibility so that high quality image display can be achieved, (6) to allow quick image display, and (7) to reduce a drive voltage required for image display.

The reversible image display medium has the following basic structure. It comprises:

two substrates opposed to each other with a predetermined gap therebetween;

one or more developer-accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities.

This kind of image display medium may be hereinafter referred to as "developer-containing type reversible image display medium".

The developer-containing type reversible image display medium is such that an electrostatic field corresponding to an image to be displayed is formed and applied to the frictionally charged developing particles accommodated in each cell of the image display medium. Thereby a Coulomb force can move the developing particles to display the image.

The electrostatic field corresponding to the image to be displayed can be formed, e.g., by applying a voltage corresponding to the image to be formed between electrodes arranged on the substrates of the medium or by forming an electrostatic latent image corresponding to the image to be formed on one of the substrates.

Such reversible image display medium comprises the two substrates opposed to each other with the predetermined gap therebetween; one or more developer-accommodating cells formed between the two substrates, each having the periphery surrounded by the partition wall; and the dry developer contained in each of the cell(s), wherein the dry developer contains at least two kinds of frictionally chargeable dry developing particles having different chargeable polarities and different optical reflection densities (in other words, exhibiting "different contrasts" or "different colors").

Consequently, even after displaying the image, a different electrostatic field, an alternating electric field, an oscillating magnetic field (when magnetic developing particles are employed) or the like may be formed so that the image can be erased. Also, the image can be rewritten by forming a different electrostatic field. Accordingly, it is not necessary to abandon the image display medium, on which the image is already displayed. The developing particles are contained in the cell, and therefore external supply of the developer is not required. Owing to the features, it is possible to reduce remarkably the use of the image display medium such as paper sheets as well as consumable materials such as a developer in the prior art.

In contrast to the image formation of the electrophotographic type or the like in the prior art, it is not necessary to melt the toner for fixing it onto a sheet of paper or the like, and a majority of the image forming energy, which is required in such image formation in the prior art, can be saved.

Owing to the above features, the medium can satisfy a current demand for reduction in environmental loads.

The developer contained in the cells includes at least two kinds of developing particles having different optical reflective densities. Further, the developing particles are dry particles, and one kind of the developing particles can appropriately screen or hide the other kind of developing particles. Therefore, image display in good contrast can be achieved.

The developer contained in the cell includes at least two kinds of chargeable dry developing particles, which can be frictionally charged to have different chargeable polarities. For image display, the developing particles which are mutually reversely charged by the frictional charging are easily moved by a Coulomb force. This also achieves image display in good contrast, can suppress remaining of the last image, also allows quick image display, and further can reduce a drive voltage required for image display.

The dry developing particles can suppress settling and condensation as compared with, e.g., electrophoretic particles in a display liquid used for electrophoretic image display, because the liquid is not present. This also suppress lowering of the contrast of the image display, and thereby can perform stable image display for a long time. Since the settling and condensation of the developing particles are suppressed, the remaining of the last image can be suppressed. As compared with the particles in the liquid, the dry developing particles enables stable image display for a long time also for the reason that the charging performance thereof changes with time to a smaller extent.

As compared with the image display by a conventional CRT display or the like, easy-on-the-eyes image display in high resolution can be performed.

The developer-containing type reversible image display medium can be prepared, for example, by a method comprising the steps of forming a substrate having concavities on one surface for forming developer-accommodating cells, accommodating a predetermined amount of the dry developer in the concavities and fixing another substrate to the substrate to form cells accommodating the dry developer.

Another method comprises the steps of forming a substrate having, on one surface, concavities for forming developer-accommodating cells, fixing another substrate to the substrate to form developer-accommodating cells between the two substrates, accommodating a predetermined amount of the dry developer in the cells and closing the cells.

However, these methods have the following difficulties (a), (b) and (c).

(a) It is desirable that the reversible image display medium is thin in its entirety because it is easy to handle, and the partition wall for forming developer-accommodating cell is thin and high (a high aspect ratio) to retain more developing particles for good image display. Accordingly, it is desirable to form a substrate having, on one surface, concavities for forming developer-accommodating cells so that the substrate body is as thin as possible and the partition wall is high (a high aspect ratio). However, actually it is very difficult to form such substrate.

To obtain a substrate having projected and dented portions including concavities on one surface of the substrate, such substrate may be made of a resin material and may be given an uneven surface by transfer molding operation.

However, if the substrate body is made in such a manner that it is thin and the partition wall is high (a high aspect ratio), the following problems arise.

(a-1) In molding operation, the substrate is heated in its entirety up to a melting point of the resin material, so that the substrate warps and the molding die takes a long time for cooling after molding operation.
(a-2) The substrate is liable to become broken or damaged in mold release operation.
(a-3) Because of construction at a high aspect ratio, a substrate having a stable shape is not easily formed.
(b) It is desirable to finely make the concavities for forming developer-accommodating cells on one surface of the substrate in the former method, and it is desirable to finely make the cells in the latter method in order to prevent the undesired movement of the developer on the substrate surface. However, it is very difficult to precisely and smoothly accommodate the predetermined amount of the developer into the fine concavities or cells. In short, difficulties would be encountered in producing a reversible image display medium which allows the precise accommodation of predetermined amount of developer in the developer-accommodating cells.
(c) The following operation may be usually attempted in the former method. A substrate having concavities for forming developer-accommodating cells on its one surface may be formed, the predetermined amount of dry developer may be accommodated in the concavities, another substrate coated with an adhesive material may be superimposed on the substrate, and the substrates are fixed together with the adhesive material, or another substrate coated with an adhesive may be superimposed on the substrate and they may be fixed together with the adhesive before the adhesive cures. In these cases, numerous developing particles adhere to the adhesive material used for fixing the substrates or to the uncured adhesive so that the adhered developing particles are not moved any longer and it becomes difficult for other developing particles to move due to the unmoved developing particles. Further the contrast in image display is lowered and the quality of image is impaired.

SUMMARY OF THE INVENTION

An object of the invention is to provide a method for producing a substrate molded from a resin (a resin-molded substrate) which has a projected and dented surface, the resin-molded substrate being such that even when a body (base) portion of the substrate is thin and a wall for forming the concavities in the projected and dented surface is thin and high (a wall of high aspect ratio), the obtained resin-molded substrate is suppressed in warping, prevented from damage and retained stably in a desired shape.

Another object of the invention is to provide a method for producing a developer-containing type reversible image display medium which is thin in its entirety, easy to handle, suppressed against warping and stably retained in a desired shape, and in which dry developer is kept in a suitable amount which allows image display.

A further object of the invention is to provide a method for producing a developer-containing type reversible image display medium in which a predetermined amount of dry developer is precisely accommodated in developer-accommodating cells.

A still further object of the invention is to provide a method for producing a developer-containing type reversible image display medium in which dry developer accommodated in developer-accommodating cells can be smoothly moved and image display can be performed in high contrast and good quality.

An additional object of the invention is to provide a method for producing a developer-containing type reversible image display medium in which two substrates constituting the medium are difficult to separate and which can withstand repeated use.

The present invention provides the following method for producing a resin-molded substrate and methods for producing reversible image display mediums.

(1) Method for Producing a Resin-Molded Substrate

The method produces a resin-molded substrate in which one surface is projected and dented, the method comprising the steps of: forming an initial resin substrate by laminating a plurality of resin layers over each other; heating and pressing one surface of the initial resin substrate by a molding die to form a projected and dented surface, wherein the heating and pressing operation is carried out in a manner such that substantially no deformation occurs on the resin layer providing a surface opposed to the one surface of the initial resin substrate.

(2) Method for Producing a Reversible Image Display Medium (2-1) A First-Type Method for Producing a Reversible Image Display Medium The method produces a reversible image display medium comprising two substrates opposed to each other with a predetermined gap therebetween; one or more developer-accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities.

The method comprises the steps of: forming a resin-molded substrate having one surface which is projected and dented and which includes concavities for forming the developer-accommodating cells by the above-mentioned method (1) for producing a resin-molded substrate; accommodating the dry developer into the concavities on the one surface of the resin-molded substrate obtained at the resin-molded substrate-forming step; and fixing another substrate to the one surface of the resin-molded substrate with an adhesive composed of the same kind of a resin material as the resin material of the resin layer providing the one surface of the resin-molded substrate.

(2-2) A Second-Type Method for Producing a Reversible Image Display Medium

The method produces a reversible image display medium comprising two substrates opposed to each other with a predetermined gap therebetween; one or more developer-accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities.

The method comprises the steps of: providing a first substrate having one surface which is projected and dented and which includes concavities for forming the developer-accommodating cells; spreading the dry developer over the one surface of the first substrate; removing the excess developer while accommodating the spread dry developer into the concavities; and fixing a second substrate to the one surface of the first substrate in which the dry developer is accommodated in the concavities to form developer-accommodating cells containing the developer.

(2-3) A Third-Type Method for Producing a Reversible Image Display Medium

The method produces a reversible image display medium comprising two substrates opposed to each other with a predetermined gap therebetween; one or more developer-accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities.

The method comprises the steps of: forming a first substrate having one surface which is projected and dented and which includes concavities for forming the developer-accommodating cells; forming a cell sheet by fixing a second substrate to the one surface of the first substrate, the cell sheet having the developer-accommodating cells between the first and second; and accommodating the dry developer into the developer-accommodating cells of the cell sheet.

Typical examples of the method of accommodating the dry developer into the developer-accommodating cells at the developer-accommodating step in the third-type method of producing a reversible image display medium include a method comprising:
(a) accommodating the dry developer into the developer-accommodating cells while giving supersonic oscillation to the cell sheet and/or the dry developer;
(b) employing a dry developer containing magnetic developing particles as the dry developer and transporting the dry developer by a magnetic force to accommodate it into the developer-accommodating cells; or
(c) subjecting interior of the dry developer-accommodating cells to vacuum suction to force the dry developer into the cells by a vacuum suction force.

(2-4) A Fourth-Type Method for Producing a Reversible Image Display Medium

The method produces a reversible image display medium comprising two substrates opposed to each other with a predetermined gap therebetween; one or more developer-accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities.

The method comprises the steps of:
providing a first substrate having one surface which is projected and dented and which includes concavities for forming the developer-accommodating cells; accommodating the dry developer into the concavities on the one surface of the first substrate; and fixing a second substrate to the one surface of the first substrate in which the dry developer is accommodated in the concavities to form developer-accommodating cells containing the developer.

The step of fixing the second substrate to the surface of the first substrate can be any of the following steps:
(a) bringing the first and second substrates into contact with each other by reducing a gas pressure in the developer-accommodating cells;
(b) fixing together the first and second substrates using a hot melt adhesive which shows adhesiveness at a temperature lower than the softening temperature of the developer; and
(c) fixing together the first and second substrates using a hot melt adhesive of the reaction type.

The foregoing and other objects, features, aspects and advantages of the present invention will become more apparent from the following detailed description and the accompanying drawings.

BRIEF DESCRIPTION OF THE DRAWINGS

FIG. 1(A) shows a section view of a reversible image display medium before image display. FIG. 1(B) shows a section view of an example of the reversible image display medium during image display.

FIG. 15(D) shows how the two substrates are fixed together with a hot melt adhesive or the like.

Figure 1A:
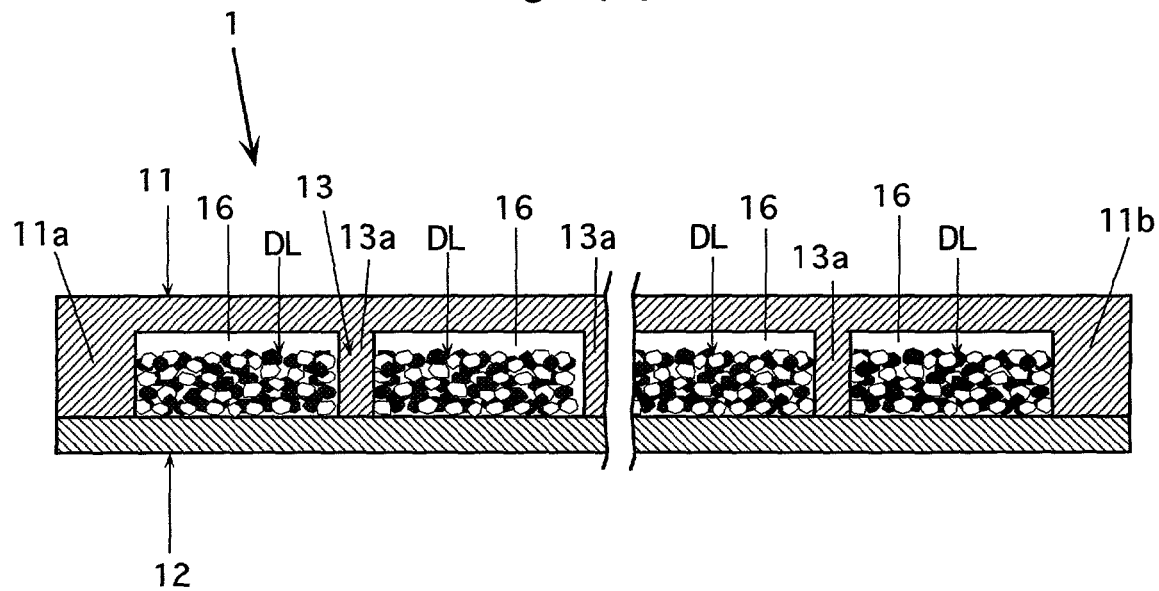
FIG. 1(A) and FIG. 1(B) show an example of the developer-containing type reversible image display medium.

DESCRIPTION OF THE PREFERRED EMBODIMENTS (1) Method for Producing a Resin-Molded Substrate and Method for Producing a Reversible Image Display Medium (First-Type Method for Producing a Reversible Image Display Medium) Using the Substrate Produced by the Method for Producing a Resin-Molded Substrate A preferred embodiment of the method for producing a resin-molded substrate is as follows.

The method for producing a resin-molded substrate, in which one surface is projected and dented, comprises the steps of: forming an initial resin substrate by laminating a plurality of resin layers (resin material layers) over each other; and heating and pressing one surface of the substrate by a molding die to provide a projected and dented surface, wherein the heating and pressing operation is carried out in a manner such that substantially no deformation occurs on the resin layer providing a surface opposed to the one surface of the initial resin substrate.

With respect to the words "substantially no deformation occurs", a slight deformation is ignored and regarded as the no deformation insofar as the problems can be overcome.

The method for producing a reversible image display medium (first-type method for producing a reversible image display medium) utilizing such method for producing a resin-molded substrate is as follows.

The method produces a reversible image display medium comprising two substrates opposed to each other with a predetermined gap therebetween; one or more developer-accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities (developer-containing type reversible image display medium).

The method comprises the steps of: forming a resin-molded substrate having one surface which is projected and dented and which includes concavities for forming the developer-accommodating cells by the above-mentioned method (1) for producing a resin-molded substrate; accommodating the dry developer into the concavities on the one surface of the resin-molded substrate which is made at the resin-molded substrate-forming step; and fixing another substrate to the one surface of the resin-molded substrate, which is made at the resin-molded substrate-forming step, with an adhesive prepared from the same kind of resin material as that of the layer providing the one surface of the substrate.

In the method for producing a reversible image display medium, the step of accommodating the dry developer may be carried out before or after fixing another substrate.

In such method for producing a resin-molded substrate, the one surface of the initial resin substrate comprising a plurality of resin layers superimposed on each other is heated and pressed by the molding die to provide the projected and dented surface. This heating and pressing operation is executed substantially without deforming the resin layer providing the surface opposed to the one surface of the initial resin substrate.

Stated more specifically, a substrate body portion (base portion) is composed of the resin layer providing the surface opposed to the one surface of the initial resin substrate. The layer(s) of resin material(s) existing over the layer of a resin material providing the surface opposed to the one surface is heated and pressed to form projected and dented portions on the one surface of the initial resin substrate. The layer of a resin material providing the surface opposed to the one surface is substantially not deformed when the one surface is heated and pressed so that the layer can retain the initial thickness and thus the initial strength due to the thickness.

For this reason, the heating operation requires only a lower temperature than when the resin-molded substrate is heated in its entirety for molding operation. Thereby the substrate body portion of the resin-molded substrate is suppressed in warping and the resin-molded substrate is cooled in a shorter time after molding operation. Nevertheless the desired irregular surface can be formed with high precision. Further, the resin-molded substrate can be released from the mold with substantially no damage. Moreover, the resin-molded substrate can be stably formed in the predetermined state.

The resin-molded substrate is formed as above even when the substrate body portion (base portion) is thin and the wall forming the concavities of projected and dented portions is thin and high (a high aspect ratio).

Such method for producing a resin-molded substrate can be employed not only for producing a substrate for a reversible image display medium but also for forming a resin molded substrate which may be used for other purposes.

According to the method for producing a reversible image display medium, the substrate formed by the method for producing a resin-molded substrate is used as one of two substrates for forming the reversible image display medium. Consequently the obtained medium is thin in its entirety, easy to handle, suppressed against warping, stably maintained in a predetermined shape. Besides, predetermined developer-accommodating concavities partitioned by walls allowing a high aspect ratio can be obtained. Thereby the dry developer is retained in an amount sufficient to perform suitable image display as a whole, thus making it possible to achieve better image display.

Another substrate is fixed to the one surface of the resin-molded substrate produced by the method for producing a resin-molded substrate, using the adhesive composed of the same kind of resin material as that of the layer providing the one surface of the substrate. Therefore the two substrates are so inseparable as to provide a reversible image display medium which can perform good image display for a long time.

In the method for producing a resin-molded substrate, the initial resin substrate may be composed of two layers of resin materials or three or more layers of resin materials. In any case, as to the softening point of the resin material, the layer of a resin material providing one surface of the initial resin substrate may be typically lower in the softening point than the layer of a resin material providing a surface opposed to the one surface of the substrate (a resin material layer composing the whole or part of the main body (base portion) of the resin-molded substrate).

The heating and pressing operation step may be repeated at the heating and pressing step. The repetition is recommendable especially when it is difficult to form a predetermined irregular surface by a single heating and pressing operation.

Usable as the molding die is at least one transfer roller having an irregular peripheral surface for molding projected and dented portions on the one surface of the initial resin substrate.

When two or more transfer rollers are used, the heating and pressing operation can be easily repeated.

A plurality of transfer rollers have uneven peripheral surfaces so stepwise varied to eventually mold the one surface of the initial resin substrate into the desired projected and dented surface. In this case, the initial resin substrate may be heated and pressed a plurality of times using the transfer rollers stepwise arranged.

Thereby the desired projected and dented surface can be assuredly formed without difficulty.

Now description is given on embodiments of the method for producing a resin-molded substrate and the method for producing a reversible image display medium with reference to FIG. 1(A) to FIG. 8.

The method for producing a resin-molded substrate is employable for the preparation of a substrate having one surface having projected and dented portions for various purposes. The following description is focused on the substrate for forming a reversible image display medium.

First, embodiments of the reversible image display medium will be explained with reference to FIG. 1(A) and FIG. 1(B) and FIG. 2(A) and FIG. 2(B).

Figure 1B:
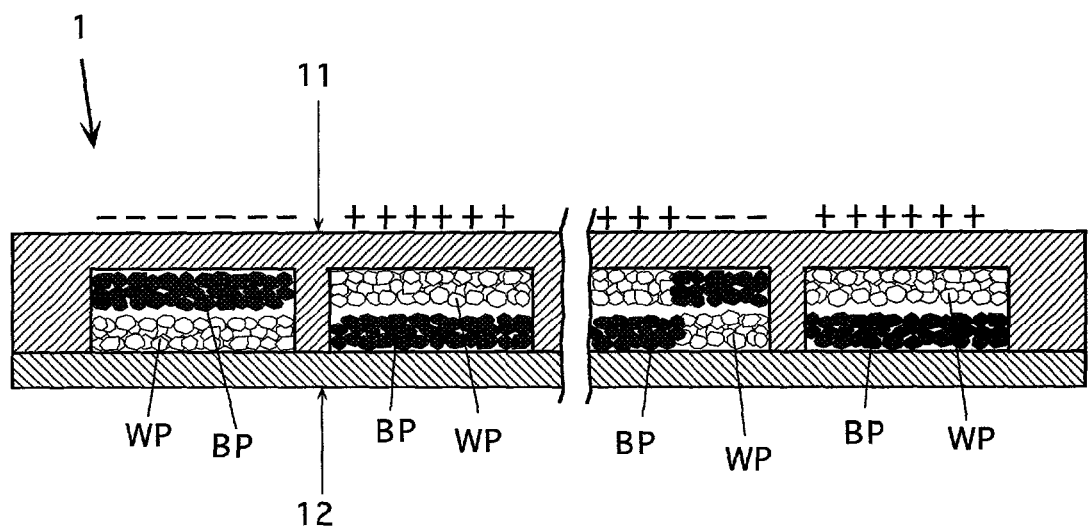

The reversible image display medium 1 shown in FIG. 1(A) and FIG. 1(B) includes a first substrate 11 and a second substrate 12. The substrates 11, 12 are opposed to each other with a predetermined gap therebetween. A partition 13 is provided between the substrates 11, 12. The partition 13 assures the predetermined gap between the two substrates. In other words, the partition 13 also serves as a spacer. The substrates 11, 12 are brought together, for example by being fixed with an adhesive, with the partition 13 provided therebetween. The partition 13 is formed integrally with the first substrate 11 in the illustrated embodiment.

The first substrate 11 is a transparent one and is formed of a material having insulating properties, although not limited thereto. The substrate 11 is formed, e.g., of a light-transparent plate such as a transparent glass plate, a transparent resin film or the like.

Figure 2A:
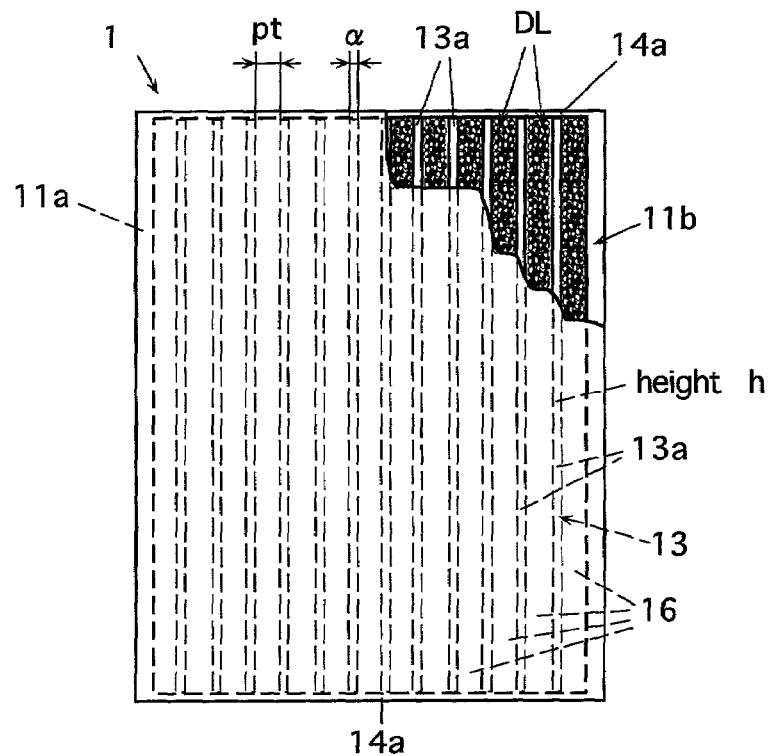
FIG. 2(A) is a plan view showing the medium of FIG. 1(A) partly cut away.

The partition 13 includes partition walls forming developer-accommodating cells 16. More specifically, the partition 13 includes a plurality of partition walls 13a extending in parallel with the lengthwise side of the medium 1 and external partition walls 11a, 11b at both side ends as shown in FIG. 2(A). Developer-accommodating cells 16 are provided between neighboring partition walls. Each cell 16 accommodates a developer DL including mutually frictionally charged white developing particles WP (negatively charged) and black developing particles BP (positively charged), wherein the white developing particles are negatively charged while the black developing particles are positively charged.

The partition wall 13a has a width $\alpha$ and a height h and is spaced by a distance of pt from adjacent partition walls. The cells 16 are not limited to the illustrated embodiment in terms of the number and shape.

The second substrate 12 is formed, e.g. of a light transparent material such as transparent glass, a resin film or the like although not limited thereto.

At least one of the first and second substrates (at least the substrate on the observation side) has a light transparency, and it is preferably a transparent one.

To close the two ends in the lengthwise direction, the ends of the first and second substrates 11, 12 are sealed (14a) by a proper measure (see FIG. 2(A)).

Figure 2B:
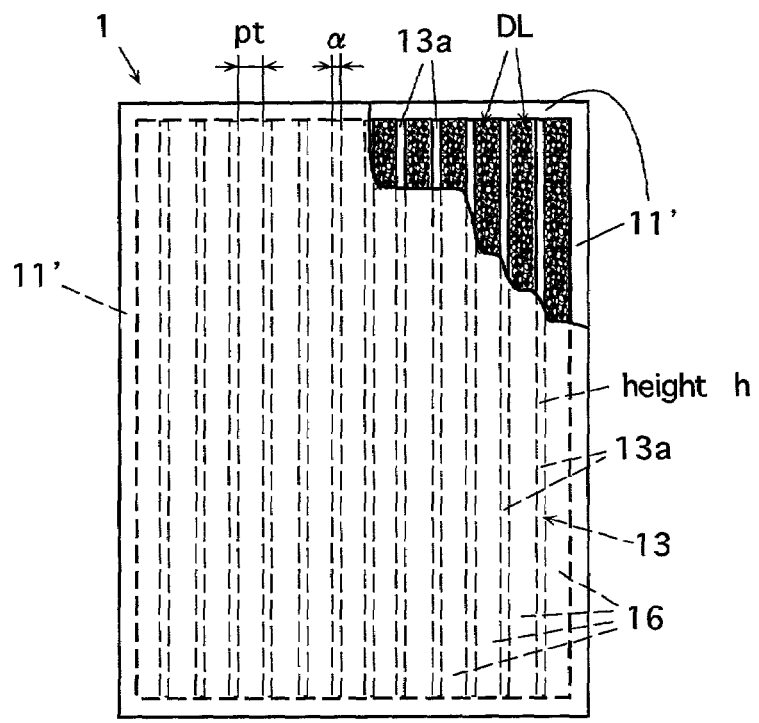
FIG. 2(B) is a plan view showing a medium, which is substantially the same as the medium of FIG. 1(A), partly cut away in which a first substrate having a peripheral wall surrounding cells is employed.

In the medium 1 as shown in FIG. 2(A), each cell 16 on the substrate 11 is open at both ends in the lengthwise direction before the substrates 11 and 12 are fixed together. An external wall may be provided at both ends in the lengthwise direction. FIG. 2(B) shows the medium 1 having the substrate 11 so formed. In the medium 1 shown in FIG. 2(B), an outer peripheral wall 11' which surrounds the total number of cells 16 on the substrate 11 is formed. The second substrate 12 is brought into contact with the outer peripheral wall 11' as well as each partition wall 13a. At one or both ends of the cells in the lengthwise direction, these portions may be sealed later without arranging the wall 11'.

In any case, each cell is eventually closed to prevent a leakage of developer DL from the cells.

In the reversible image display medium 1, for example, (a) an electrostatic latent image corresponding to an image to be displayed is formed directly on the first substrate 11, or (b) an image carrier carrying an electrostatic latent image corresponding to an image to be formed is brought into contact with (or brought close to) the first substrate 11, whereby the electric field for driving the developing particles is applied to the developer DL, and whereby the image can be displayed as shown in FIG. 1(B). If necessary, the second substrate 12 may be set to a grounded potential or other potential.

In the reversible image display medium 1, an electrostatic field corresponding to the image to be displayed is formed on the frictionally charged developing particles WP, BP contained in each cell 16, whereby the developing particles are moved by a Coulomb force to achieve development for image display.

After displaying the image on the medium 1, a different electrostatic field, an alternating electric field, an oscillating magnetic field (if at least one kind of developing particles, e.g.

black developing particles BP, are magnetic developing particles) or the like may be formed so that the image can be erased. Also, an image can be rewritten by forming a different electrostatic field. Accordingly, it is not necessary to abandon the image display medium, on which the image is already displayed. The external supply of the developer is not required. Owing to these features, it is possible to reduce remarkably the use of the image display medium such as paper sheets as well as consumable materials such as a developer in the prior art.

In contrast to the image formation of the electrophotographic type or the like in the prior art, it is not necessary to melt the toner for fixing it onto a sheet of paper or the like, and a majority of the image forming energy, which is required in such image formation in the prior art, can be saved.

Owing to the above features, the medium can satisfy a current demand for reduction in environmental loads.

In the reversible image display medium 1, the developer contained in the cell 16 includes at least two kinds of developing particles BP, WP having different optical reflective densities, in other words, exhibiting different contrasts or different colors. Further, the developing particles are dry particles, and one kind of the developing particles can appropriately screen or hide the other kind of developing particles. Therefore, image display in good contrast can be achieved. For image display, the developing particles which are mutually reversely charged by the frictional charging are easily moved by a Coulomb force. This also achieves image display in good contrast, can suppress remaining of the last image, also allows quick display of images, and further can reduce a drive voltage required for image display.

The dry developing particles can suppress settling and condensation as compared with, e.g., electrophoretic particles in a display liquid used for the above-mentioned electrophoretic image display, because the liquid is not present. This also suppresses lowering of the contrast of the image display, and thereby can perform stable image display for a long time. Since the settling and condensation of the developing particles are suppressed, the remaining of the last image can be suppressed. As compared with the particles in the liquid, the dry developing particles allow stable image display for a long time also for the reason that the charging performance thereof changes with time to a smaller extent.

As compared with the image display by a conventional CRT display or the like, easy-on-the-eyes image display in high resolution can be performed.

Now description is given on embodiments of the method for producing a resin-molded substrate having one surface having projected and dented portions which can be used as the first substrate 11 in such reversible image display medium.

Figure 3A:
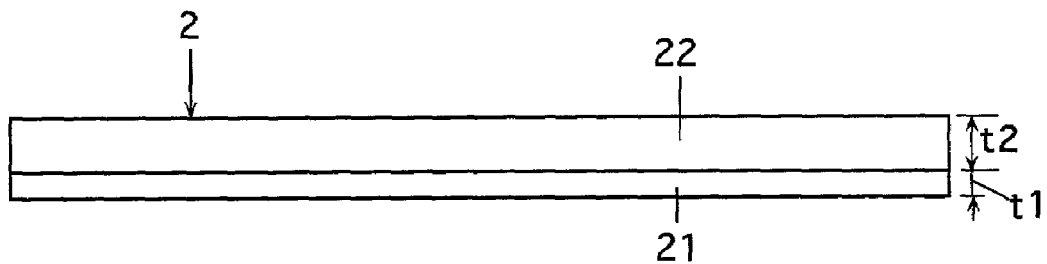
FIG. 3(A) is a side view partly showing an example of an initial resin substrate.

First, an initial resin substrate 2 composed of a laminate of two layers 21, 22 of resin materials is formed as shown in FIG. 3(A).

The layer 22 of a resin material has a softening point lower than the layer 21 of resin material.

Figure 3B:
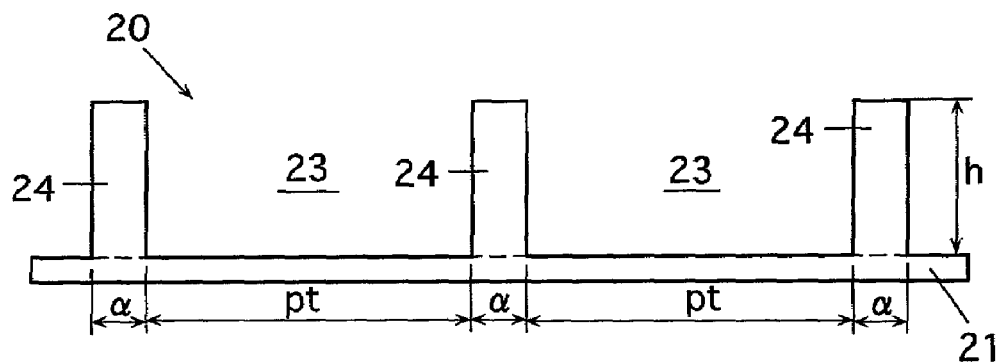
FIG. 3(B) is a side view partly showing a resin-molded substrate formed from the initial resin substrate of FIG. 3(A).

The layer 22 of a resin material having a lower softening point is heated and pressed with a molding die to form an irregular surface. In this case, the heating and pressing operation is conducted in such a manner that the layer 21 is substantially not deformed. As shown in FIG. 3(B), this operation gives a resin-molded substrate 20 including numerous partition walls 24 with a thickness α and a height h, and numerous groove-like concavities 23 adjacent to the partition walls 24 and having a width of pt, all substantially on the layer 21 of a resin material.

Next, description is given on examples of the heating and pressing operation using such mold die with reference to FIGS. 4 to 7(D). The molding operation is conducted using transfer rollers.

Figure 4:
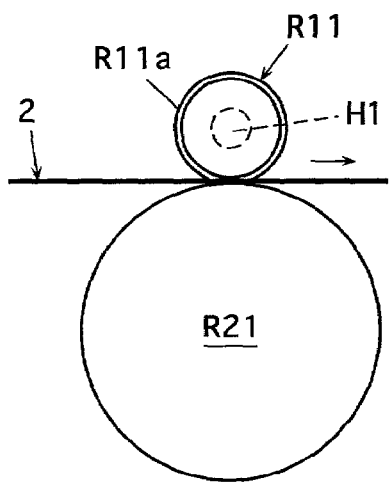
FIG. 4 shows an example of the method for producing a resin-molded substrate.

FIG. 4 shows transfer molding operation using (a) a transfer roller R11 having an irregular peripheral surface R11a on which projected portions and dented portions are alternately formed in parallel with each other, and in which a heater H1 is internally provided, and (b) a press roller R21 with a flat and smooth peripheral surface having a larger diameter than the transfer roller R11. The transfer roller R11 is opposed to the press roller R21 with a predetermined gap therebetween (the gap is substantially equal to the thickness of the layer 21). The two rollers are driven to rotate at the same peripheral speed while the initial resin substrate 2 with the layer 22 directed toward the transfer roller R11 is passed between the two rollers R11, R21, whereby mainly the layer 22 of the initial resin substrate 2 is heated and pressed by the roller R11 to produce a resin-molded substrate 20 as shown in FIG. 3(B).

Figure 5:
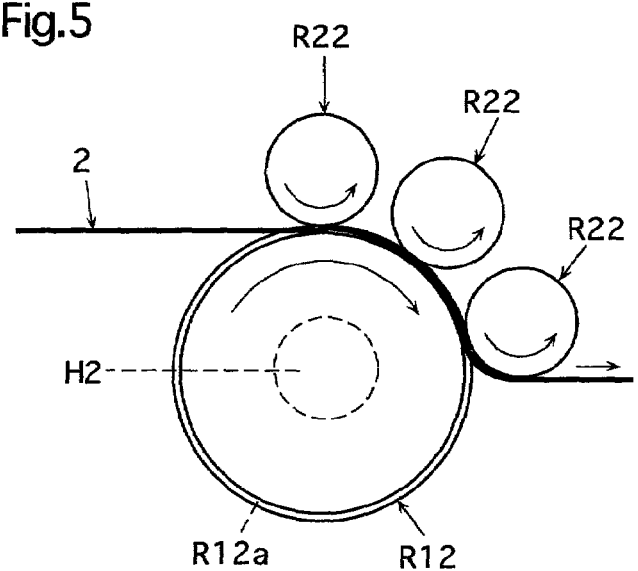
FIG. 5 shows another example of the method for producing a resin-molded substrate.

FIG. 5 shows transfer molding operation using (a) a transfer roller R12 of greater diameter having an irregular peripheral surface R12a on which projected portions and dented portions are alternately formed in parallel with each other and in which a heater H2 is internally provided, and (b) three press rollers R22 of smaller diameter than the transfer roller R12, each having a flat and smooth peripheral surface.

The transfer roller R12 is opposed to the three press rollers R22 stepwise arranged with a predetermined gap therebetween (the gap is substantially equal to the thickness of the layer 21). The rollers are driven to rotate at the same peripheral speed while the initial resin substrate 2 is passed between the press roller R22 and the transfer roller 12 at the first stage, between the press roller R22 and the transfer roller 12 at the second stage, and between the press roller R22 and the transfer roller 12 at the third stage, respectively in this order. Thereby the heating and pressing operation was repeated three times on the initial resin substrate 2 to give a resin-molded substrate 20 as shown in FIG. 3(B).

Figure 6:
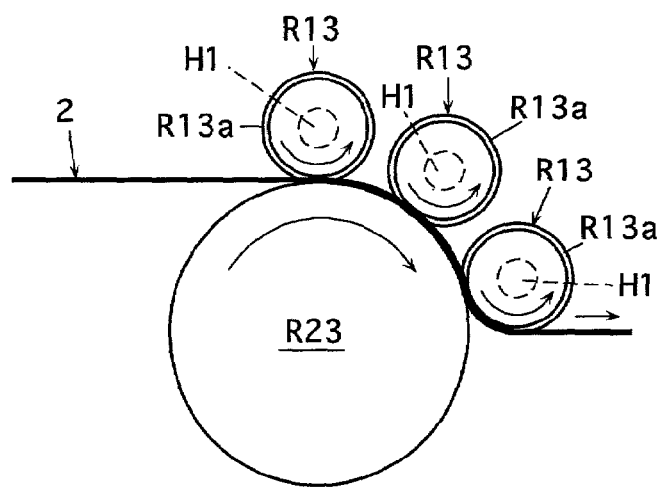
FIG. 6 shows a further example of the method for producing a resin-molded substrate.

FIG. 6 shows transfer molding operation using (a) three same transfer rollers R13 having an irregular peripheral surface R13a on which projected portions and dented portions are alternately formed in parallel with each other and in which a heater H1 is internally provided, and (b) a press roller R23 of larger diameter than the transfer roller R13, which has a flat and smooth peripheral surface. The three transfer rollers R13 stepwise arranged are opposed to the press roller R23 with a predetermined gap therebetween (the gap is substantially equal to the thickness of the layer 21). The rollers are driven to rotate at the same peripheral speed while the initial resin substrate 2 is passed between the press roller R23 and the transfer roller R13 at the first stage, between the press roller R23 and the transfer roller R13 at the second stage, and between the press roller R23 and the transfer roller R13 at the third stage, respectively in this order. Thereby the heating and pressing operation was repeated three times on the initial resin substrate 2 to give a resin-molded substrate 20 as shown in FIG. 3(B).

FIGS. 7(A) to 7(D) shows transfer molding operation using (a) a first-stage transfer roller R14 having an irregular peripheral surface R14a on which projected portions and dented portions are alternately formed in parallel with each other and in which a heater H1 is internally provided, (b) a second-stage transfer roller R15 having an irregular peripheral surface R15a on which projected portions and dented portions are alternately formed in parallel with each other and in which a heater H1 is internally provided, (c) a third-stage transfer roller R16 having an irregular peripheral surface R16a on which projected portions and dented portions are alternately formed in parallel with each other and in which a heater H1 is internally provided, and (d) a press roller R23 having a flat and smooth peripheral surface.

The transfer rollers R14, R15 and R16 have the same diameter and the press roller R23 has a diameter greater than the three transfer rollers.

Figure 7A:
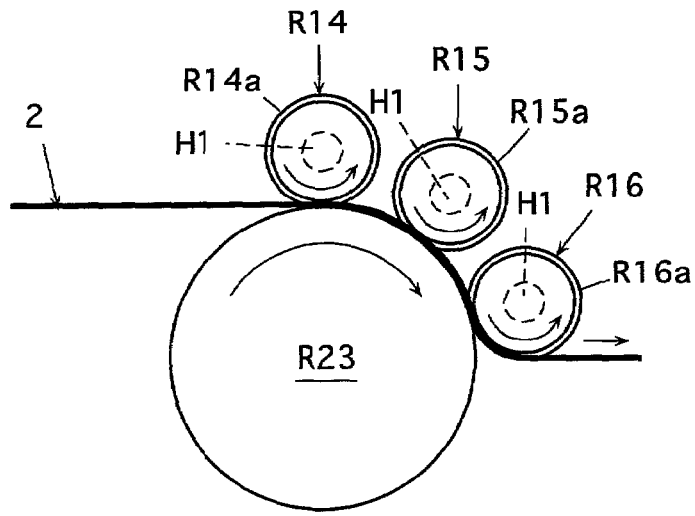
FIG. 7(A) shows a still further example of the method for producing a resin-molded substrate.
Figure 7B:
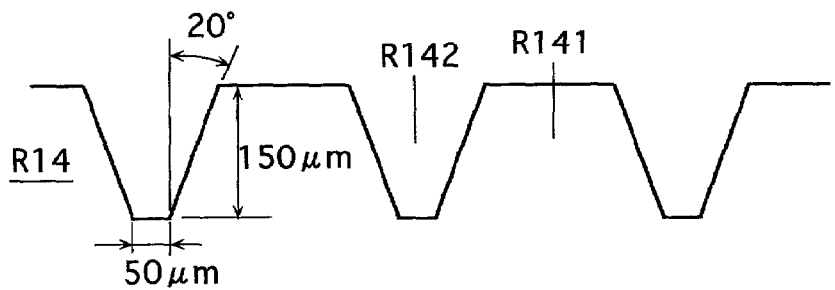
FIG. 7(B) shows an irregular peripheral surface of a first stage transfer roller.
Figure 7C:
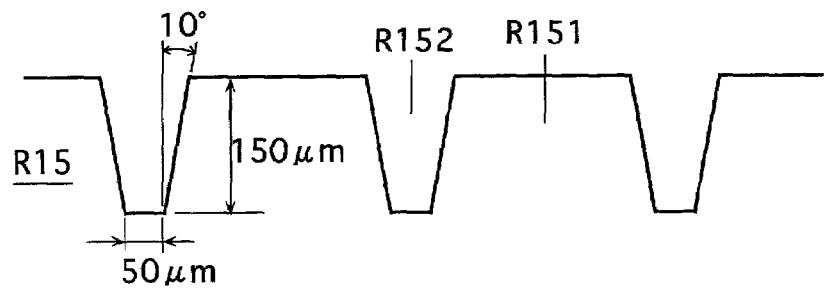
FIG. 7(C) shows an irregular peripheral surface of a second stage transfer roller.
Figure 7D:
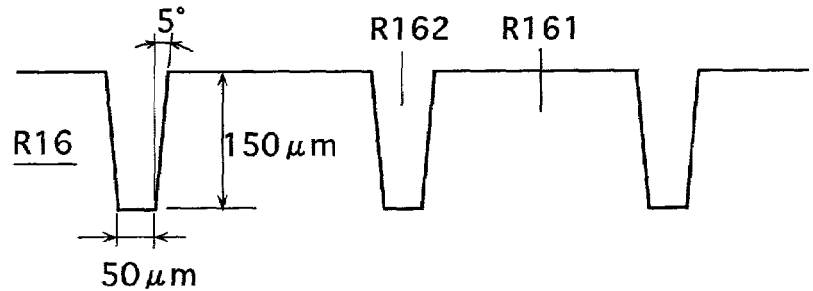
FIG. 7(D) shows an irregular peripheral surface of a third stage transfer roller.

As shown in FIG. 7(B) to FIG. 7(D), the transfer rollers R14, R15 and R16 have projected portions R141, R151 and R161 of the same height and dented portions R142, R152 and R162 which have the bottoms of the same width. An inclination angle of two side walls in dented portions R142, R152 and R162 with respect to a plane vertical to a central axis of rollers is decreased in the order of the dented portions R142, R152 and R162. In other words, the widths of dented portions R142, R152 and R162 are narrower in this order.

As shown in FIG. 7(A), the three transfer rollers R14, R15 and R16 are opposed, at three stages, to a press roller R23 with a predetermined gap therebetween (the gap is substantially equal to the thickness of the layer 21). The rollers are driven to rotate at the same peripheral speed while the initial resin substrate 2 is passed between the transfer roller R14 and the press roller R23 at the first stage, between the transfer roller R15 and the press roller R23 at the second stage, and between the transfer roller R16 and the press roller R23 at the third stage, respectively in this order. Thereby the heating and pressing operation was repeated three times on the initial resin substrate 2 to give a resin-molded substrate 20 as shown in FIG. 3(B).

In any of the methods for producing a resin-molded substrate 20 as shown in FIG. 4 to FIG. 7 (A), while the layer 21 of higher softening point in the substrate 2 is used as the main body portion (base portion) of the substrate 2, an irregular surface is produced by heating and pressing mainly the layer 22 of lower softening point such that the layer 21 is not substantially deformed. Accordingly, the portion of layer 21 composing the main body portion can retain substantially the initial thickness and thus the initial strength due to the thickness.

For this reason, the heating operation requires only a lower temperature than when the resin substrate is heated in its entirety for molding operation. Thereby the substrate body portion of the resin substrate is suppressed against warping and the substrate is cooled in a shorter time after molding operation. Nevertheless the desired irregular (projected and dented) surface including the concavities 23 can be formed with high precision. Further, the resin substrate 20 can be released from the mold with substantially no damage in release of the mold. Moreover, the resin substrate 20 can be stably formed in the predetermined state.

Even when the substrate body portion 21 (base portion) is thin and the wall 24 forming the concavities 23 of projected and dented portions is thin (thickness α) and high (height h) to allow a relatively high aspect ratio, the wall can be easily formed.

In the transfer molding operation as shown in FIG. 5 and FIG. 6, even when it is difficult to form the desired irregular surface by a single heating and pressing operation, the heating and pressing operation can be repeated so that the partition wall 24 of the resin-molded substrate 20 allowing a high aspect ratio can be more easily made.

In transfer molding operation as shown in FIG. 7(A), a plurality of transfer rollers R14, R15 and R16 have irregular peripheral surfaces R14a, R15a and R16a which are so stepwise varied as to eventually form the desired uneven shape on the one surface of the initial resin substrate 2. Thereby a resin-molded substrate 20 having partition walls 24 allowing a high aspect ratio can be made more easily and assuredly without a problem.

The resin-molded substrate 20 formed in the manner as described above can be used for constructing the reversible image display medium 1 illustrated in FIG. 1(A), FIG. 1(B), FIG. 2(A) and FIG. 2(B).

Figure 3C:
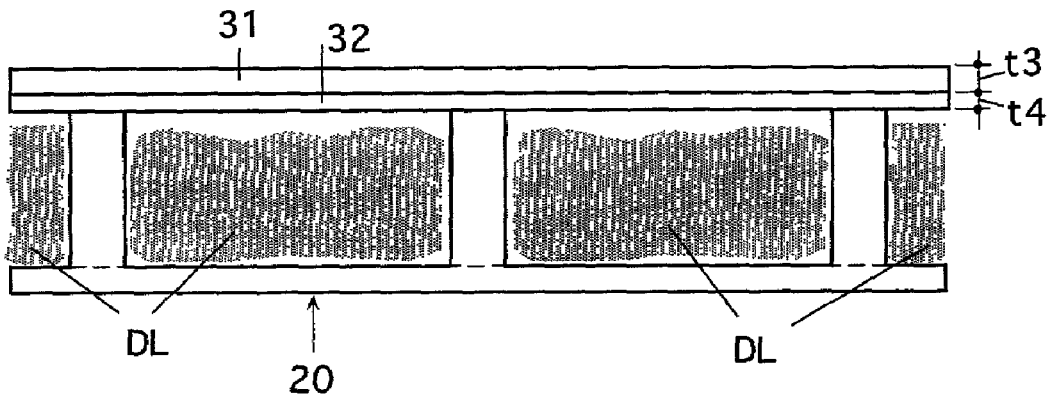
FIG. 3(C) is a schematic section view partly showing a reversible image display medium obtained from the substrate of FIG. 3(B).

Stated more specifically, as shown in FIG. 3 (C), after accommodating a predetermined amount of the dry developer DL in the concavities 23 of the above-obtained resin-molded substrate 20 serving as the first substrate, the substrate 20 is fixed to the second substrate 31 coated, at its one face, with an adhesive 32 made of the same kind of a resin material as the layer 22, giving a reversible image display medium of the same type as the reversible image display medium 1.

Figure 8:
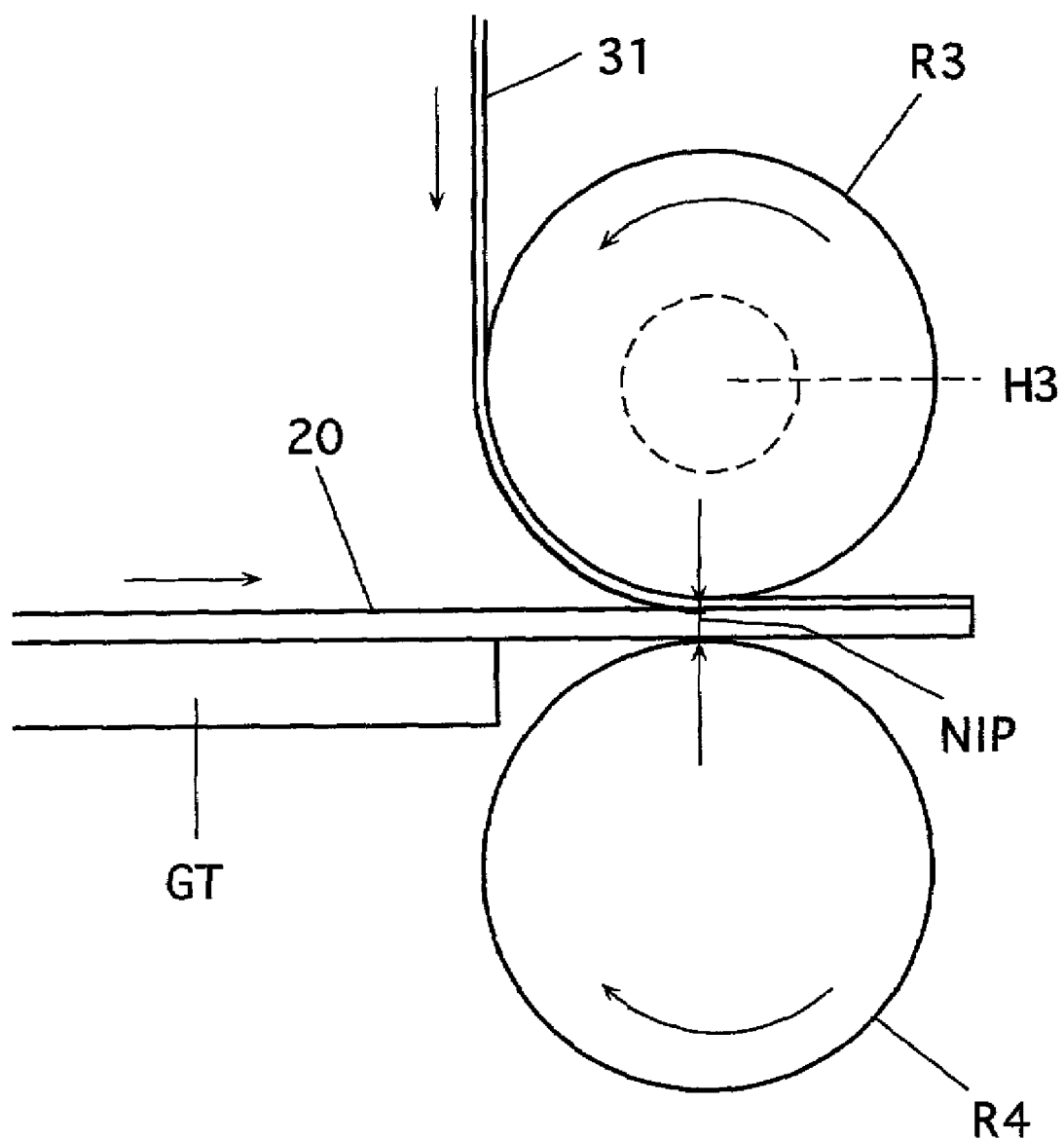
FIG. 8 is a side view showing an example of a device for fixing the first and second substrates of the reversible image display medium.

The second substrate 31 is fixed to the first substrate 20, e.g. as shown in FIG. 8. Stated more specifically, a substrate-feeding upper roller R3 internally provided with a heater H3 is opposed to a substrate-feeding lower roller R4 with a predetermined gap NIP therebetween. Then the resin-molded substrate 20 as supported by a guide table GT is passed between the two rollers with its concavities 23 and partition walls 24 directed toward the side of the roller R3 while the second substrate 31 coated with the adhesive 32 is also passed between the two rollers. Thus the two substrates can be easily fixed together in this way by suitable heating and pressing operation.

Now description is given on experimental examples by transfer molding methods shown in FIG. 4 to FIG. 7(A) for molding the resin-molded substrate 20.

In any experiment, the following substrates were used as the initial resin substrate 2.

The initial resin substrate 2 included a resin material layer 21 which was a polyethylene terephthalate (PET) film having a thickness t1 of 30 μm and a resin material layer 22 which was a layer of a hot melt adhesive (product of Mitsui Dupon CO., Ltd., trade name EEA) having a thickness t2 of 50 μm. The layer 21 was superimposed on the layer 22 by laminating.

In any of transfer molding methods, any transfer roller was kept at a surface temperature of 75° C. The initial resin substrate 2 was passed between each pair of the transfer roller and the press roller at a pressing force of 200 kg-weight at a rate of 300 mm/sec. A gap width between the transfer roller and the press roller was set at 39 μm.

For transfer of uneven peripheral shape, it is better to conduct the transfer molding operation at a higher temperature and higher pressure at a lower speed. However, if the temperature is too high, the substrate will melt, whereas excessively high pressure will irregularly change the shape and excessively low speed impairs the productivity. In view of these problems, the above conditions were set.

(1) Experiment by the Transfer Method of FIG. 4

The transfer roller R11 had an irregular peripheral surface shown in FIG. 7(D) with the following dimensions.

The projected portion R161 had a height of 150 μm, and the dented portion R162 had a bottom width of 50 μm. An inclination angle (side wall) with respect to a plane vertical to a central axis of roller was 5 degrees. The partition wall 24 of the obtained resin-molded substrate 20 had a height h of 100 μm.

(2) Experiments by the Transfer Methods of FIGS. 5 and 6

The transfer roller R12 in FIG. 5 (R13 in FIG. 6) had an irregular peripheral surface as shown in FIG. 7(D) with the following dimensions.

The projected portion R161 had a height of 150 μm. The dented portion R162 had a bottom width of 50 μm and an inclination angle of 5 degrees (side wall) with respect to a plane vertical to a central axis of roller. The partition wall 24 of the obtained resin-molded substrate 20 had a height h of 100 μm as a result of passage of first step roller R22 (R13), a height h of 115 μm as a result of passage of second step roller R22 (R13), and a height h of 120 μm as a result of passage of third step roller R22 (R13).

(3) Experiment by the Transfer Method of FIG. 7(A) to FIG. 7(D)

The transfer rollers R14, R15 and R16 had an irregular peripheral surface wherein the projected portions had the same height of 150 μm. and the dented portions had the same bottom width of 50 μm, but side walls of dented portions were different from each other in the inclination angle with respect to a plane vertical to a central axis of rollers as follows:

20 degrees as shown in FIG. 7(B) on the transfer roller R14;
10 degrees as shown in FIG. 7(C) on the transfer roller R15; and
5 degrees as shown in FIG. 7(D) on the transfer roller R16.

The partition wall 24 of the obtained resin-molded substrate 20 had a height h of 120 μm as a result of passage of first step roller R14, a height of 140 μm as a result of passage of second step roller R15, and a height of 150 μm as a result of passage of third step roller R16.

The obtained resin-molded substrate 20 had partition walls 24 each having a thickness α of 50 μm, a height h of 150 μm, and a dented portion width pt of 300 μm.

As described above, the partition wall 24 was 1.5 times higher in height than when formed by single stage transfer operation in FIG. 4.

This is because the transfer rollers having dented portions of varied widths from a wide width to a narrow width are stepwise arranged to facilitate entrapment of resin material into the dented portions.

A reversible image display medium was prepared using, as a first substrate, the resin-molded substrate 20 produced in experimental example by the transfer method of FIG. 7(A) to FIG. 7(D). After accommodation of the predetermined amount of the developer in the concavities of the substrate, the second substrate 31 was fixed to the first substrate 20 by heating and pressing operation using the fixing device shown in FIG. 8. The second substrate 31 was composed of a PET film having a thickness t3 of 30 μm coated at one surface by laminating with an adhesive 32 which was a hot melt adhesive (product of Mitsui Dupon CO., Ltd., trade name EEA) to form an adhesive layer having a thickness t4 of 20 μm. In this operation, the roller R3 for feed of the second substrate 31 was set to a surface temperature of 150° C. and the gap NIP between the feed rollers R3 and R4 was set to 210 μm. The two substrates were fed at a rate of 30 mm/sec.

The reversible image display medium obtained in this way was thin in its entirety, easy to handle, suppressed in warping, stably maintained in a predetermined shape and provided with developer-accommodating concavities provided by the partition walls 24 constructed at a high aspect ratio, so that the dry developer was held in an amount sufficient to achieve suitable image display, thereby making it possible to perform better image display.

The second substrate 31 was fixed to the first substrate 20 using the adhesive 32 composed of the same material as the resin material 22 for the partition walls 24 of the first substrate 20 so that the two substrates were fixed together with high bonding strength, resulting in increased bending resistance. Thereby the reversible image display medium was able to perform good image display for a long time.

(2) Second-Type and Third-Type Methods for Producing a Reversible Image Display Medium (2-1) Second-Type Method for Producing a Reversible Image Display Medium Other preferred embodiments of the method for producing a reversible image display medium are described below.

The method produces a reversible image display medium comprising two substrates opposed to each other with a predetermined gap therebetween; one or more developer-accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities.

The method comprises the steps of: providing a first substrate having one surface which is projected and dented and which includes concavities for forming the developer-accommodating cells; spreading the dry developer over the one surface of the first substrate; removing the excess developer while accommodating the spread dry developer into the concavities; and fixing a second substrate to the one surface of the first substrate in which the dry developer is accommodated in the concavities to form developer-accommodating cells containing the developer.

At the developer-spreading step in this method, the dry developer is spread over the one surface of the substrate before accommodating the dry developer in the concavities for accommodation of the dry developer in the first substrate. The developer can be freely spread over a wide area so that the spread developer can be accommodated easily and assuredly into the concavities at the developer-removing step. At the developer-removing step, excess developer is removed while the spread developer is accommodated into each concavity. Further at the second substrate-fixing step, the second substrate is fixed to the one surface of the first substrate wherein the developer is accommodated in the concavities.

In this way, a reversible image display medium can be prepared in which the dry developer is accommodated precisely in a predetermined amount into each developer-accommodating cell.

At the developer-spreading step, the following methods are preferred for spreading the dry developer smoothly over a wide area:

(a) supplying the dry developer to the one surface of the first substrate while subjecting the developer to supersonic (ultrasonic) oscillation; and
(b) employing a dry developer containing magnetic dry developing particles as the developer and spreading the developer over the one surface of the first substrate using a magnet roller which carries the developer over the peripheral surface to transport it to a spot (position) whereat it is to be spread, and supplies it at the spot on the one surface of the first substrate.

When the developer is spread using supersonic wave or the magnet roller, the developer can be smoothly and widely spread while loosening the developer.

At the developer-removing step, the excess developer can be removed while accommodating the spread developer into the concavities, for example, by a simple sure method comprising sliding a developer-removing member over the one surface of the first substrate on which the developer is spread.

When using the first substrate having a plurality of developer-accommodating groove-like concavities serving as the concavities, which extend in parallel with each other, the developer-removing member is preferably made to slide over the one surface of the substrate on which the developer is spread in a direction crossing the direction of groove-like concavities extending and then to slide over the one surface in the direction of the groove-like concavities extending. Thereby the developer can be accommodated more securely in each concavity and the excess developer can be more securely removed. The developer is prevented from resting on the tops of the partition walls forming the concavities and can be easily removed from the top thereof by sliding the developer-removing member in the direction of the groove-like concavities extending.

In any case, examples of useful developer-removing members are elastic blades or rollers made of rubber, and rigid blades or rollers made of metals. When the substrate having concavities is elastic and the partition walls forming the concavities are uniform in height, rigid blades or rollers are preferable. When the substrate having concavities is non-elastic or is low in elasticity and the partition walls forming the concavities are irregular in height, elastic blades or rollers are suitable.

(2-2) Third-Type Method for Producing a Reversible Image Display Medium

Other preferred embodiments of the method for producing a reversible image display medium are described below.

The method produces a reversible image display medium comprising two substrates opposed to each other with a predetermined gap therebetween; one or more developer-accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities.

The method comprises the steps of: forming a first substrate having one surface which is projected and dented and which includes concavities for forming developer-accommodating cells; forming a cell sheet by fixing a second substrate to the one surface of the first substrate, the cell sheet having developer-accommodating cells between the first and second substrates; and accommodating the dry developer into the developer-accommodating cells in the cell sheet.

The cell sheet to be used in this method is ready to receive the developer in the cells to accommodate the developer, each of which is opened at least one portion for receiving the developer before accommodation of the developer in each cell and is capable of closing the open cells after accommodation of the developer.

Since this method allows the formation of a cell sheet before accommodation of developer, it suppresses entrapment of the developer between the tops of the partition walls forming concavities for providing developer-accommodating cells in the first substrate and the second substrate to be fixed to the top of the first substrate. Further, the second substrate can be prevented from floating or becoming suspended from the first substrate.

The method also allows fixing of the second substrate to the first substrate, if necessary, by application of heat, irrespectively of a heat resistance temperature of the developer to be used.

Further, even when an adhesive is used for fixing of the second substrate, the developer would be unlikely to adhere to the adhesive, whereby the amount of developer to be actually used for the intended operation can be secured and the image density contrast can be stabilized.

Since the adhesion of developer to the adhesive can be suppressed or avoided, the second substrate can be provided on the image observation side and can be thinner from the viewpoint of the strength than the base portion of the first substrate which has to have projected and dented portions. Thus this feature is advantageous for image display.

In this method for producing a reversible image display medium, the developer can be accommodated in the developer-accommodating cells at the developer-accommodating step, for example, by the following methods.

(a) The dry developer is accommodated in the developer-accommodating cells while subjecting the cell sheet and/or the dry developer to supersonic oscillation.

(b) When a dry developer containing magnetic dry developing particles is used as the dry developer, the dry developer is transported by a magnetic force and is accommodated into the developer-accommodating cells.

(c) The developer-accommodating cells are internally subjected to vacuum suction to force the dry developer into the developer-accommodating cells by a vacuum suction force.

Any of the above-described developer-accommodating methods can smoothly accommodate the developer in the predetermined amount into the developer-accommodating cells, resulting in production of a reversible image display medium in which the predetermined amount of the dry developer is accommodated precisely in the developer-accommodating cells.

(2-3) Detailed Embodiments of the Method for Production of a Reversible Image Display Medium Now detailed description is given on embodiments of the above-mentioned second type and third-type methods for production of a reversible image display medium with reference to FIG. 9(A) to FIG. 14(D).

The reversible image display medium to be produced is substantially the same type one as that already described with reference to FIG. 1(A), FIG. 1 (B), FIG. 2(A) and FIG. 2(B).

(2-3-1) Developer

Given below are developer DL to be used for producing a reversible image display medium to be described later.

Preparation of White Developing Particles

In a Henschel mixer were thoroughly mixed 100 parts by weight of thermoplastic polyester resin (softening point: 121° C., Tg: 67° C.), 40 parts by weight of titanium oxide (Ishihara Sangyo Kaisha, Ltd.: CR-50) and 5 parts by weight of salicylic acid-zinc complex (minus-charge-controlling agent, Orient Chemical Co., Ltd.: Bontron E-84). The mixture was further mixed by a twin-screw extruder and then cooled.

The mixture was roughly pulverized, then pulverized by a jet mill and classified with wind to obtain white fine particles which have a volume average particle size of 10 μm.

To the white fine particles was added 0.3 parts by weight of hydrophobic silica particles (Nihon Aerosil Co., Ltd.: Aerosil R-972). The mixture was mixed by a Henschel mixer to prepare white developing particles WP.

Preparation of Black Developing Particles

In a Henschel mixer were thoroughly mixed 100 parts by weight of styrene-n-butyl methacrylate resin (softening point: 132° C., Tg: 65° C.), 2 parts by weight of carbon black (Lion Oil & Fat Co., Ltd.: Ketchen Black), 1.5 parts by weight of silica (Nihon Aerosil Co., Ltd.: # 200) and 500 parts by weight of magnetic powder containing magnetite (RB-BL, Titan Kogyo Co., Ltd.). The mixture was further mixed by a kneader.

After cooling, the mixture was roughly pulverized by a feather mill, then finely pulverized by a jet mill and classified with wind to obtain black particles BP which have a volume average particle size of 25 μm.

Preparation of Developer

The white developing particles WP (30 g) and the black developing particles BP (70 g) were placed into a polyethylene bottle. The bottle was rotated by a ball mill pedestal to perform the kneading and mixing for 30 minutes to obtain a developer DL. The white developing particles WP were negatively charged and black developing particles BP were positively charged in the developer.

(2-3-2) Substrates and Adhesive

Given below are a first substrate 11, a second substrate 12 and an adhesive for fixing the two substrates. All of them were used for producing a reversible image display medium to be explained below.

The first substrate 11 is one which has a multiplicity of groove-like concavities 16' for forming developer-accommodating cells on one surface of a 188 μm-thick film made of polyethylene terephthalate (PET) by dicing saw operation, the concavities 16' extending in parallel with each other and having a width pt of 300 μm, a depth (height of partition wall) h of 163 μm, a thickness α of partition wall 13a of 50 μm (refer to FIG. 2(A) for pt, h and α).

The second substrate 12 is a 25 μm-thick film made of polyethylene terephthalate (PET) having a surface to be adhered which is subjected to a corona discharge pre-treatment for increase of surface roughness for adhesion.

An adhesive Ad is a polyester adhesive (product of Toyobo Co., Ltd., trade name Byron BX218S, solid content 35%, a 1:1 mixture of solvents (cyclohexanone/Solvesso 150, applied to a thickness of 10 μm)

(2-3-3) Production of a Reversible Image Display Medium Shown in FIG. 9(A) to FIG. 9(D)

Figure 9A:
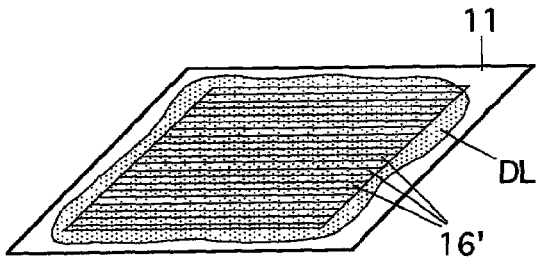
FIG. 9(A) to FIG. 9(D) show steps in other example of the method for producing a reversible image display medium.

First, the first substrate 11 is formed which has a multiplicity of groove-like concavities 16' extending in parallel with each other for forming developer-accommodating cells on one surface of the substrate as shown in FIG. 9(A). Then a developer DL is spread over the one surface having the concavities. The spread developer DL is partly entrapped in the concavities 16'.

Figure 10A:
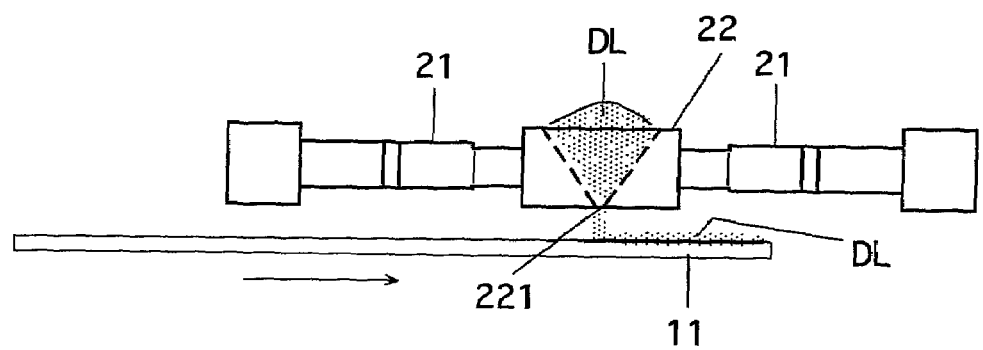
FIG. 10(A) shows an example of the method of spreading the developer by supersonic oscillation.
Figure 10B:
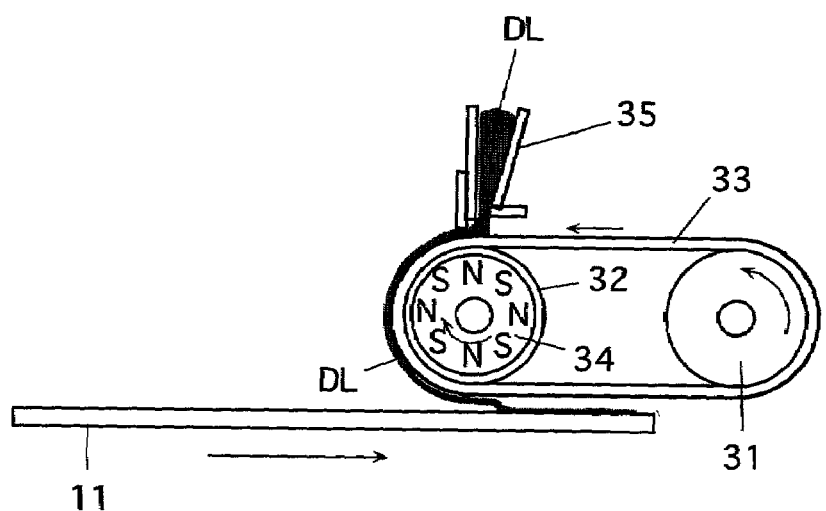
FIG. 10 (B) shows an example of the method of spreading the developer by a magnet roller.
FIG. 10(C) shows a direction of spreading the developer toward the substrate.

The developer DL is spread by the method shown in FIG. 10(A) or the method shown in FIG. 10(B). More specifically, in the method shown in FIG. 10(A), the developer DL is placed into a hopper 22 for supply of developer. The hopper 22 is connected to supersonic vibrators 21 and is oscillated by the vibrators 21 while the first substrate 11 is transported to a position under the hopper 22 with the groove-like concavities 16' facing up. The developer DL subjected to supersonic oscillation is dropped onto the substrate 11 through a slit 221 formed at a lower end of the hopper 22 while being sufficiently loosened. The developer DL is uniformly spread over a wide area concurrently with the movement of the substrate 11.

Figure 10C:
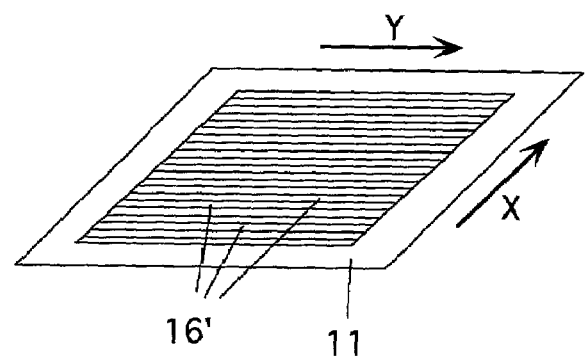

The substrate 11 may be moved in a direction Y in which the groove-like concavities 16' extend or in a direction X crossing the direction Y (see FIG. 10(C)).

In the method shown in FIG. 10(B), an endless belt 33 is wound on a driving pulley 31 and a driven pulley 32 in the form of a sleeve. The driven pulley 32 is internally provided with a magnet roller 34 in which N and S magnetic poles are alternately arranged at its surface. A hopper 35 for supply of the developer is disposed above the driven pulley 32. The endless belt 33 is driven to rotate counterclockwise in the drawing while the magnet roller 34 is driven to rotate clockwise. The developer DL is supplied from the hopper 35 above the belt 33.

The developer DL containing magnetic developing particles BP is supported over the magnet roller 32 via the belt 33 and is moved toward the underside of the roller 32 at which the developer is moved away from the magnet roller 32 as interrupted with the belt 33 from the roller 32. Eventually the developer DL is dropped onto the substrate 11 and is spread over a wider area as the substrate 11 moves forward.

Figure 9B:
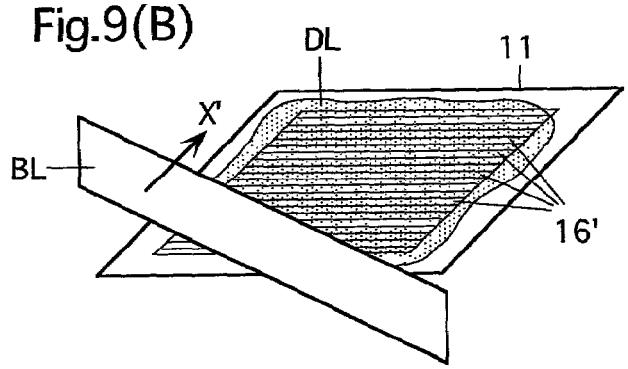
Figure 9C:
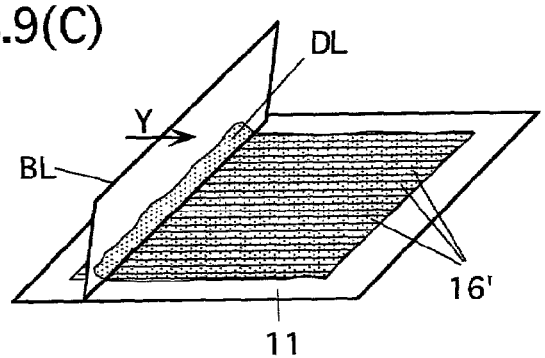

A blade BL is made to slidingly brush one surface of the first substrate 11 on which the developer DL is spread as shown in FIG. 9(B) and FIG. 9(C). As depicted in FIG. 9(B), the blade BL is moved to slide over the surface of the substrate 11 in the direction X' crossing the direction Y in which the groove-like concavities 16' extend (in other words, in a diagonal direction of the substrate 11, i.e. in a direction of diagonally crossing the concavities 16'). This assures the accommodation of the spread developer in the groovelike concavities 16' and the removal of the majority of excess developer from the surface of the substrate.

Figure 9D:
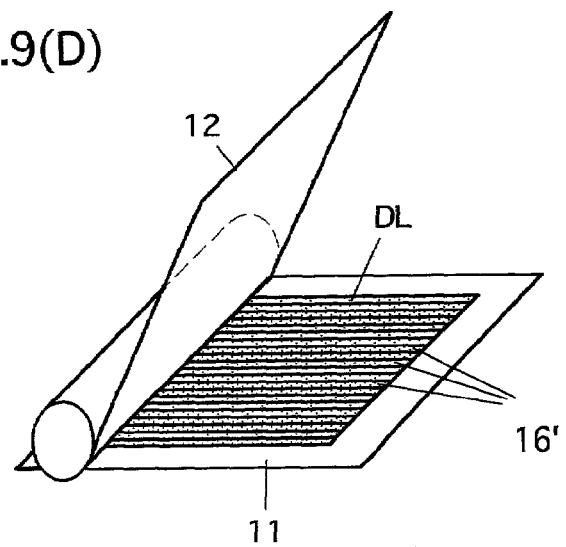

Thereafter the blade BL is moved, as shown in FIG. 9(C), to slide over the surface of the substrate virtually in parallel with the groove-like concavities 16'. As a result, the sliding operation with the blade BL sufficiently removes the excess developer including the developer remaining on tops of the partition walls forming the concavities and the developer excessively entrapped in the concavities. After accommodation of predetermined amount of the developer DL into the concavities 16' and removal of excess developer, the second substrate 12 entirely coated at one surface with the adhesive Ad is fixed progressively to the first substrate 11 as shown in FIG. 9(D). Thereby a reversible image display medium is produced.

Figure 11A:
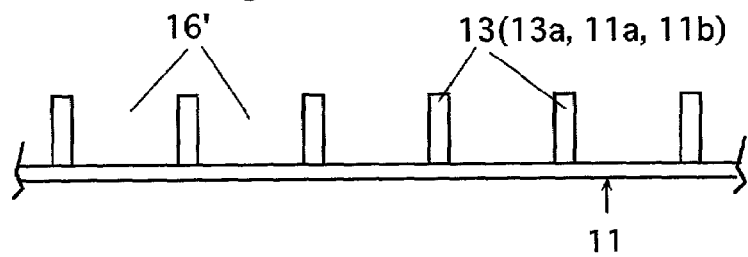
FIG. 11(A) to FIG. 11(E) show the steps to be carried out for forming the cell sheet in still further example of the method for producing a reversible image display medium.
Figure 11B:
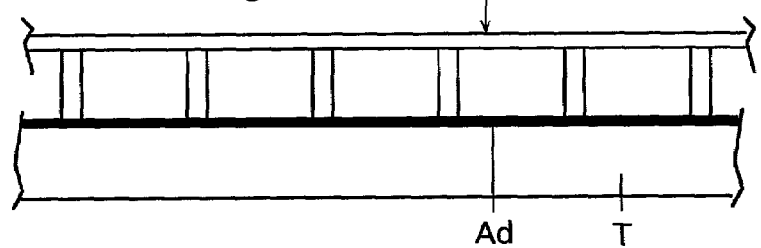
Figure 11C:
Figure 11D:
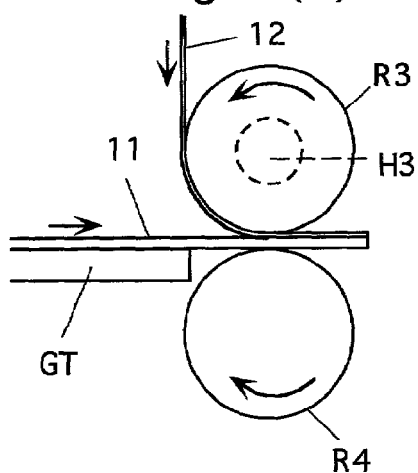
Figure 11F:
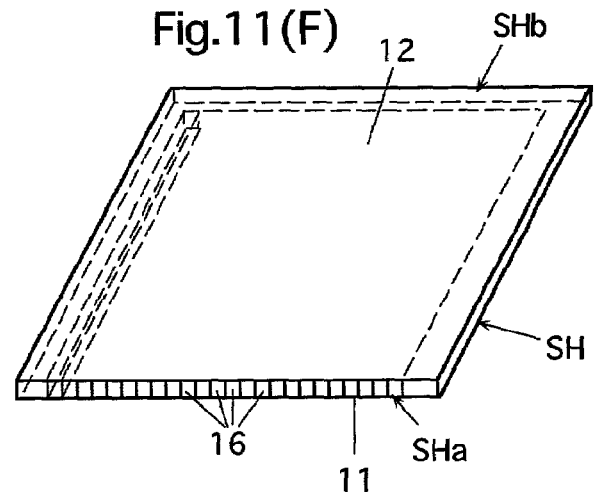
FIG. 11(F) is a perspective view of the cell sheet shown in FIG. 11(E).
Figure 11E:
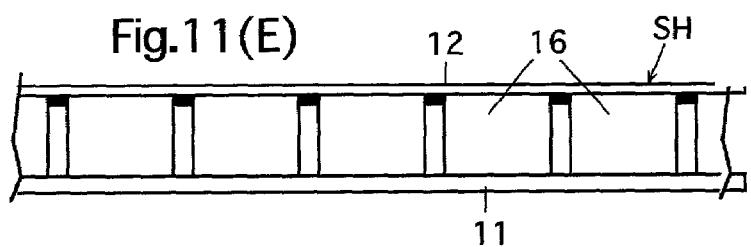
Figure 12A:
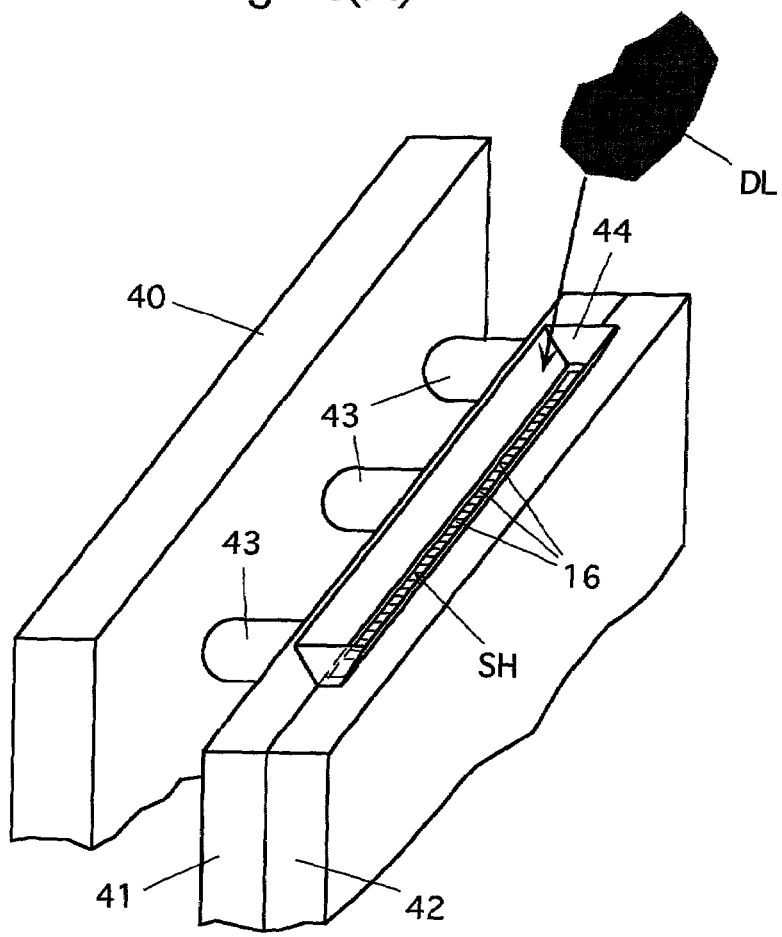
FIG. 12(A) is a perspective view showing how the developer is accommodated by giving supersonic oscillation to the cell sheet formed by the steps shown in FIG. 11(A) to FIG. 11(E).
Figure 12B:
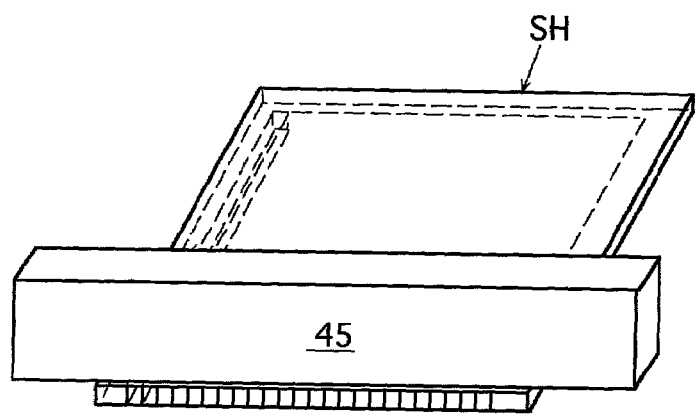
FIG. 12(B) shows how an end portion of the cell sheet is sealed by welding after accommodation of the developer.

(2-3-4) Production of a Reversible Image Display Medium Shown in FIG. 11(A) to FIG. 11(F) and FIG. 12 (A) and FIG. 12(B)

A first substrate 11 is provided which has a multiplicity of groove-like concavities 16' for forming developer-accommodating cells on one surface of the substrate as shown in FIG. 11(A).

As shown in FIG. 11(B), the adhesive Ad is applied onto a top of a table T. The top of partition 13 (tops of partition walls 13a, 11a, 11b (see FIG. 2(A)) is brought into contact with the adhesive Ad to adhere the adhesive Ad to the top thereof.

The first and second substrates 11, 12 are fixed together by a fixing device shown in FIG. 11(D). The fixing device includes an upper roller R3 for feed of the substrate internally provided with a heater H3, a lower roller R4 for feed of the substrate and a table GT for guiding the substrate. The first substrate 11 having the groove-like concavities facing up is passed between the two rollers as guided by the table GT while the second substrate 12 is passed therebetween around the upper roller 3. In this way, the substrates 11, 12 are fixed together with the adhesive AD by heating with the heater H3. In this manner, a cell sheet SH is formed as shown in FIG. 11(E) and FIG. 11(F).

One end SHb of the cell sheet SH is closed by a proper method as by heat-sealing to close one ends of the cells 16, but the other end SHa is kept open to accept the developer.

The cell sheet SH with its open end SHa turned upward is interposed between a pair of open-close support plates 41, 42 as shown in FIG. 12(A). Of the paired plates, the support plate 41 is connected to a supersonic vibrator 43 supported by a base 40. Then a hopper 44 for supply of the developer is disposed immediately above the cell sheet SH as sandwiched between the support plates 41, 42. Thereafter the developer DL is placed into the hopper 44. Subsequently the support plates 41, 42, namely the cell sheet SH, is vibrated by the supersonic vibrator 43. Thereby the developer DL dropping from the hopper 44 is smoothly supplied into the opening of each cell 16. When the predetermined amount of the developer is accommodated into the cells, the cell sheet SH is released. Then, the open cell ends are closed, for example, with a supersonic horn 45 for sealing as shown in FIG. 12(B). In this way, a reversible image display medium is produced.

The supersonic vibrator 43 consists of three vibrators each operable at 28 kHz and 100 W.

(2-3-5) Production of a Reversible Image Display Medium Shown in FIG. 13(A) to FIG. 13(D)

Figure 13A:
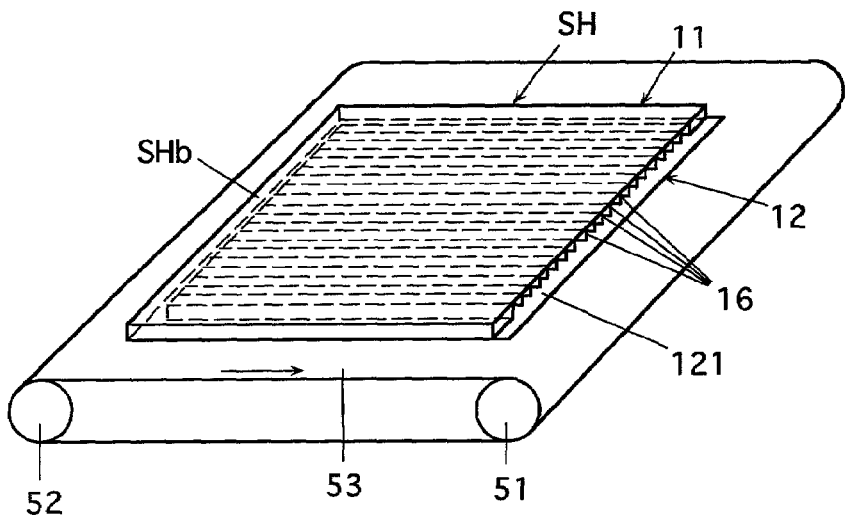
FIG. 13(A), FIG. 13(B) and FIG. 13(D) show steps in additional example of the method for producing a reversible image display medium.
Figure 13B:
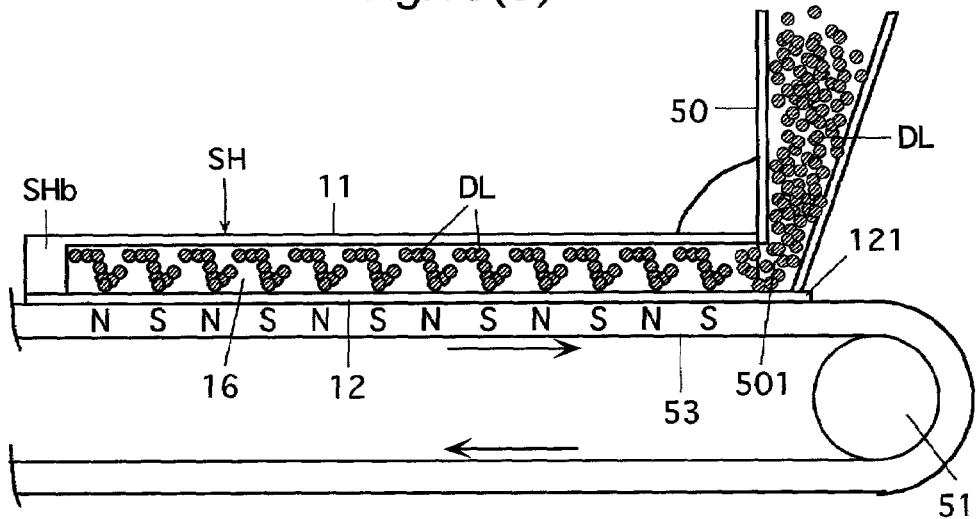

The same cell sheet SH as that shown in FIG. 11(F) is formed except that an end portion 121 of the second substrate 12 on the side on which the cells 16 are open slightly protrudes from the first substrate 11. This cell sheet SH is placed on an endless belt 53 with the second substrate 12 facing down as shown in FIG. 13(A) and FIG. 13(B). The endless belt 53 is a magnet belt having N and S magnetic poles alternately arranged and is wound on a driving pulley 51 and a driven pulley 52.

A hopper 50 for supply of the developer is set on the protruding end portion 121 of the second substrate 12 in the cell sheet SH placed on the belt 53. Then a slit 501 for supply of the developer in the hopper 50 is brought to a position as opposed to the open ends of the developer-accommodating cells 16. In this way, the cell sheet SH is disposed in a predetermined place irrespectively of movement of the belt 53.

Figure 13C:
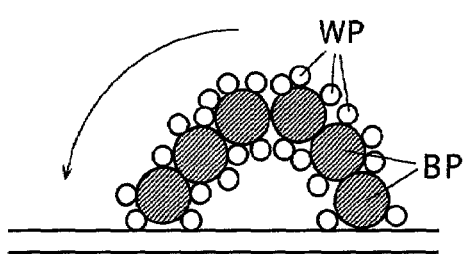
FIG. 13(C) is a view for describing the transport of the developer by a magnet belt.
Figure 13D:
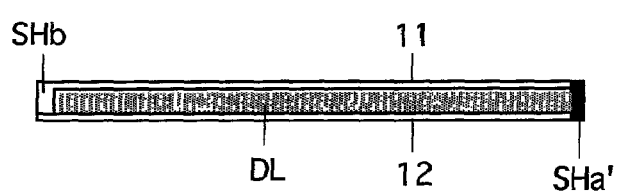

In this state, the belt 53 is driven to move clockwise in the drawing. In other words, a belt portion sliding under the cell sheet SH is driven to move from the closed end portion SHb of the cell sheet toward the protruding end portion 121. Then, the developer DL containing magnetic developing particles BP, which is supplied from the hopper 50, is rolled into ear-like masses composed of a series of magnetic developing particles BP connected to each other as shown in FIG. 13(C) due to the action of an oscillating magnetic field by moved magnetic poles.

The masses are carried inwardly of the cells 16 together with white developing particles WP electrostatically adhering thereto. In this way, the predetermined amount of developer DL is placed into each cell 16. Thereafter the cell sheet SH is released, and the open ends of the cells are closed by deposit sealing, e.g. by the supersonic horn 45 in the same manner as shown in FIG. 12(B), whereby a reversible image display medium is produced.

(2-3-6) Production of a Reversible Image Display Medium Shown in FIG. 14(A) to FIG. 14(D)

The same cell sheet SH as that shown in FIG. 11(F) is formed except that both ends of each cell 16 are open. Both ends 121, 122 of the second substrate 12, respectively slightly protrude from the first substrate 11.

This cell sheet SH is placed on a table T1 with the second substrate 12 facing down. A hopper 60 for supply of the developer is attached to one end portion 121 of the second substrate 12 such that a slit 601 at a lower end of the hopper 60 is brought to a position opposed to one end portions of the cells 16. A filter 71 is disposed on the other end portion 122 of the second substrate 12 to block the other open end portions of the cells 16. One end portion 72 of a vacuum suction device is connected via a filter 71 to the other open end portions of the cells 16. The filter 71 used in this embodiment is one made of polytetrafluoroethylene and having vents of 5 μm in diameter.

Each cell 16 is internally subjected to vacuum suction at the end portion 72 of the vacuum suction device to force the developer DL, which is supplied from the hopper 60, into the cells 16 by a vacuum suction force.

After the predetermined amount of the developer is accommodated into the cells 16, the cell sheet SH is released and placed on the table T2 for sealing and cutting. The open end portions of the cell sheet SH are closed by deposit sealing using supersonic horns 73 having a blade for cutting the substrate, and the protruding end portions 121, 122 of the second substrate are cut away.

Figure 14A:
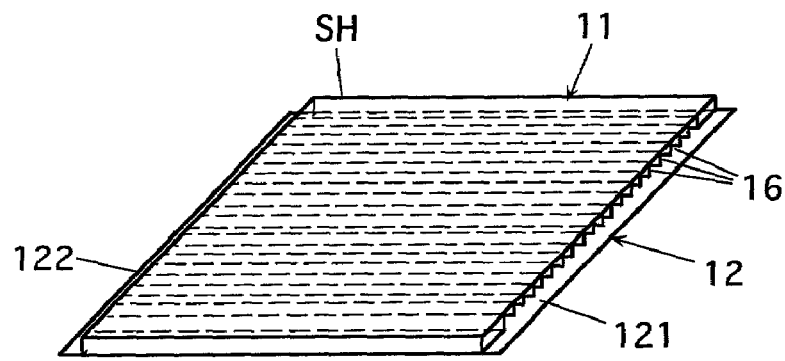
FIG. 14(A) to FIG. 14(D) show the steps in further example of the method for producing a reversible image display medium.
Figure 14B:
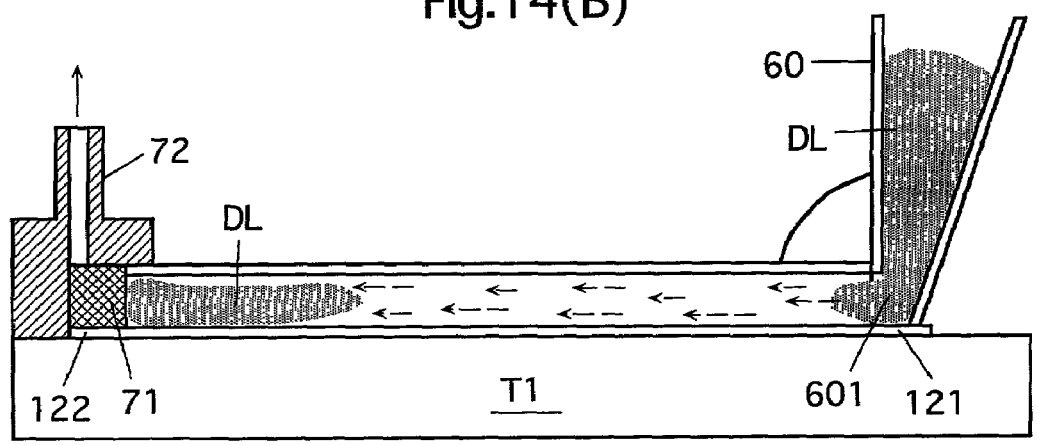
Figure 14C:
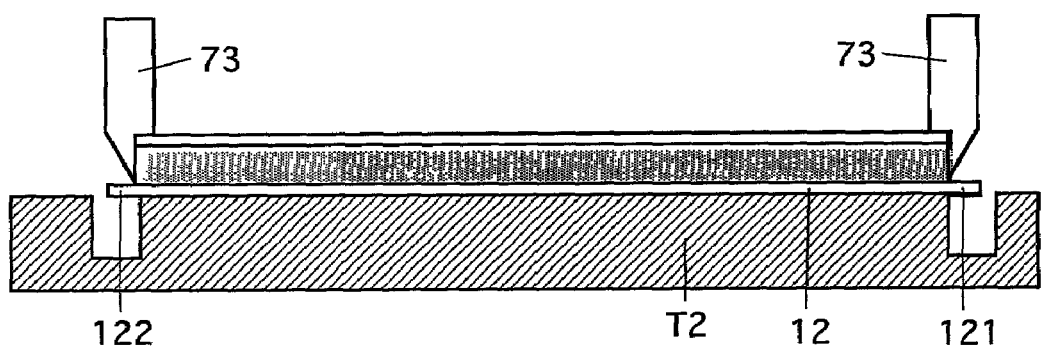
Figure 14D:

In this way, a reversible image display medium is obtained with both end portions sealed as shown in FIG. 14(D). When required for vacuum suction from the cells, at least one of the partition walls for forming the cells may have vent(s) such as fine cutout(s) on the wall.

(3) Fourth-Type Method for Producing a Reversible Image Display Medium

Other preferred embodiments of the method for producing a reversible image display medium are as follows.

The method produces a reversible image display medium comprising two substrates opposed to each other with a predetermined gap therebetween; one or more developer-accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities.

The method comprises the steps of:

providing a first substrate having one surface which is projected and dented and which includes concavities for forming the developer-accommodating cells; accommodating the dry developer into the concavities on the one surface of the first substrate; and fixing a second substrate to the one surface of the first substrate in which the dry developer is accommodated in the concavities to form developer-accommodating cells containing the developer.

The step of fixing the second substrate to the surface of the first substrate can be any of the following steps:

(a) fixing together the first and second substrates by reducing a gas pressure in the developer-accommodating cells;
(b) fixing together the first and second substrates using a hot melt adhesive which shows the adhesiveness at a lower temperature than the softening temperature of the developer; and
(c) fixing together the first and second substrates using a hot melt adhesive of the reaction type.

In any of the methods of fixing the second substrate, the developer accommodated in the developer-accommodating cells can be smoothly moved, thereby giving a reversible image display medium which can display high quality image in high contrast.

In the method (a) of fixing the two substrates by reducing the pressure in the developer-accommodating cells, an adhesive may be interposed between the two substrates in a periphery of the substrates before reduction of the pressure and the pressure in the cells may be reduced before the adhesive is cured. This method can easily fix the two substrates and can keep the substrates fixed together for a longer time.

In the method (b) using a hot melt adhesive or in the method (c) using a reaction-type hot melt adhesive, the two substrates are substantially inseparable, resulting in production of a reversible image display medium which can withstand repeated use.

In any of methods (b) and (c), a small amount of the developer may adhere to the adhesive. But the amount is so suppressed that no serious problem arises in using the reversible image display medium compared with the use of the above-mentioned conventional adhesive material (tackified material) or uncured adhesive.

Now given below is description on embodiments of the above-mentioned fourth-type method for producing a reversible image display medium with reference to FIG. 15(A) to FIG. 15(D).

The reversible image display medium to be produced is substantially the same type one as the mediums already described with reference to FIG. 1(A), FIG. 1(B), FIG. 2(A) and FIG. 2(B).

EXAMPLE 1

Figure 15A:
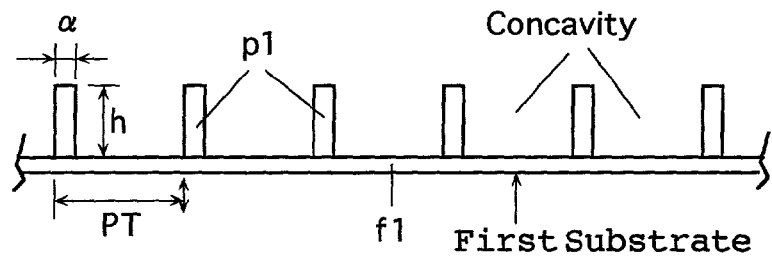
FIG. 15(A) is a section view partly showing the substrate having the concavities for forming developer-accommodating cells.
Figure 15B:
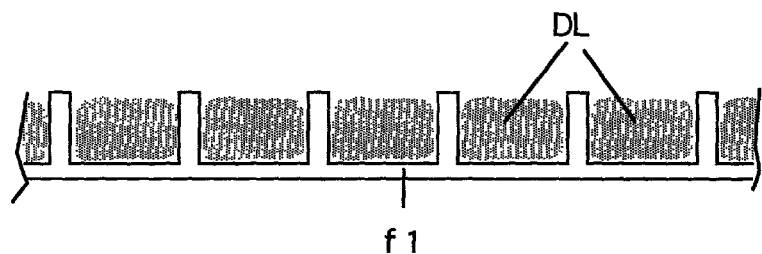
FIG. 15(B) is a section view showing the state of developer accommodated in the concavities of the substrate.

As shown in FIG. 15(A), numerous sheets p1 serving as partition walls (width α=50 μm and height h=150 μm) were fixed at a pitch PT of 350 μm in parallel with each other to one surface of a 25 μm-thick film f1 made of polyethylene terephthalate (PET) to form a first substrate. A predetermined amount of developer DL was accommodated as shown in FIG. 15(B) into groove-like concavities for forming developer-accommodating cells on the first substrate using a rubber blade (not shown).

Figure 15C:
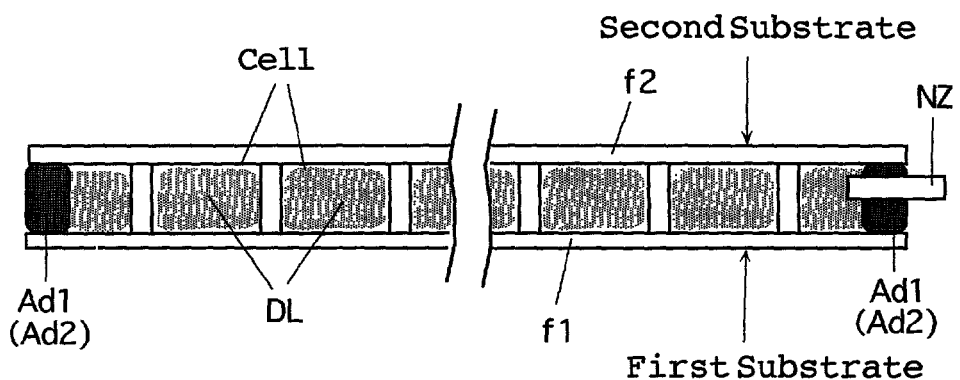
FIG. 15(C) shows how the two substrates are fixed together by vacuum suction.

Thereafter as shown in FIG. 15(C), a second substrate composed of a 25 μm-thick film f2 made of polyethylene terephthalate (PET) was provided, and an epoxy adhesive Ad1 was applied to its periphery. The second substrate was pre-fixed to the first substrate with the adhesive interposed therebetween before the adhesive cured. Concurrently, the gas pressure in the developer-accommodating cells was reduced by vacuum suction with a nozzle NZ disposed between the two substrates to fix together the two substrates. The nozzle NZ was withdrawn from the two substrates thus fixed and the resulting void was sealed with an uncured adhesive Ad1 almost at the same time as withdrawal of the nozzle NZ. As a result of fixing together the two substrates in this way, a reversible image display medium was formed which can repeatedly perform stable image display.

To facilitate the reduction of gas pressure in the cells, vent(s) such as fine cutout(s) may be formed in at least one of the partition walls p1 between the cells when so required.

EXAMPLE 2

As shown in FIG. 15(A), numerous sheets p1 serving as partition walls (width α=50 μm and height h=150 μm) were fixed at a pitch PT of 350 μm in parallel with each other to one surface of a 25 μm-thick film f1 made of polyethylene terephthalate (PET) to form a first substrate. A predetermined amount of developer DL was accommodated, as shown in FIG. 15(B), into groove-like concavities for forming developer-accommodating cells on the first substrate using a rubber blade (not shown).

Thereafter as shown in FIG. 15(C), a second substrate composed of a 25 μm-thick film f2 made of polyethylene terephthalate (PET) was provided, and a hot melt adhesive Ad2 (product of Toyobo Co., Ltd., trade name Byron 200) was applied to its periphery. The second substrate was pre-fixed to the first substrate with the adhesive Ad2 interposed therebetween before the adhesive cured. Concurrently, the pressure in the developer-accommodating cells was reduced by vacuum suction with a nozzle NZ disposed between the two substrates to fix together the two substrates. The nozzle NZ was withdrawn from the two substrates thus fixed and the resulting void was sealed with uncured adhesive Ad2 almost at the same time as withdrawal of the nozzle NZ. As a result of fixing together the two substrates in this way, a reversible image display medium was formed which can repeatedly perform stable image display.

To facilitate the reduction of pressure in the cells, vent(s) such as fine cutout(s) may be formed, as done in Example 1, in at least one of the partition walls p1 between the cells when so required.

Developing particles P1 of polyester resin having a lower softening point, as detailed later, which were contained in the developer DL used in Example 2 had a softening point of 150° C. The hot melt adhesive Ad2 exhibited its adhesiveness at a temperature of 120° C.

EXAMPLE 3

As shown in FIG. 15(A), numerous sheets p1 serving as partition walls (width α=50 μm and height h=150 μm) were fixed at a pitch PT of 350 μm in parallel with each other to one surface of a 25 μm-thick film f1 made of polyethylene terephthalate (PET) to form a first substrate. A predetermined amount of developer DL was accommodated, as shown in FIG. 15(B), into groove-like concavities for forming developer-accommodating cells on the first substrate using a rubber blade (not shown).

Figure 15D:
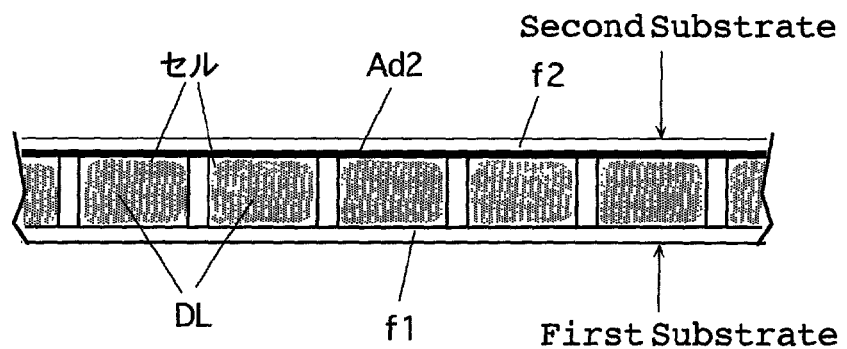

Thereafter as shown in FIG. 15(D), a second substrate composed of a 25 μm-thick PET film f2 was provided, and a hot melt adhesive Ad2 (product of Toyobo Co., Ltd., trade name Byron 200) was applied to one surface of the second substrate to a thickness of 10 μm. The second substrate was superimposed on the first substrate with the adhesive Ad2 interposed therebetween and was subjected to heat press treatment at 120° C. for 30 seconds. In this way, a reversible image display medium was formed which can repeatedly perform stable image display.

The developing particles of lower softening point contained in the developer DL used in Example 3 were the particles P1 having a softening point of 150° C.

EXAMPLE 4

Some reversible image display mediums were formed in the same procedure as in Example 3 with the exception of using a reaction-type hot melt adhesive (more specifically a moisture-curing hot melt adhesive) in place of the hot melt adhesive Ad2. The reversible image display mediums were able to repeatedly perform stable image display.

Examples of the reactive (reaction type) hot melt adhesive which can be used are as follows:
(1) KUM 2000 (product of Konishi Co., Ltd.) polyurethane-based, usable at a temperature of 110° C. to 120° C.; and
(2) UM 3000 (product of Konishi Co., Ltd.) polyurethane-based, usable at a temperature of 100° C. to 120° C.

COMPARATIVE EXAMPLE

As shown in FIG. 15(A), numerous sheets p1 serving as partition walls (width α=50 μm and height h=150 μm) were fixed at a pitch PT of 350 μm in parallel with each other to one surface of a 25 μm-thick film f1 made of polyethylene terephthalate (PET) to form a first substrate. A predetermined amount of developer DL was accommodated, as shown in FIG. 15(B), into groove-like concavities for forming developer-accommodating cells on the first substrate using a rubber blade (not shown).

Thereafter as shown in FIG. 15(D), a second substrate composed of a 25 μm-thick PET film f2 was provided, and a hot melt adhesive Ad2 (product of Toyobo Co., Ltd., trade name Byron 200) was applied to one surface of the second substrate to a thickness of 10 μm. The second substrate was superimposed on the first substrate with the adhesive Ad2 interposed therebetween and was subjected to heat press treatment at 120° C. for 30 seconds.

Developing particles P2 of polyester resin having a lower softening point, as detailed later, which were contained in the developer DL used in the Comparative Example had a softening point of 110° C.

The obtained reversible image display medium, in which the developer agglomerated due to heat, achieved image display only in poor contrast.

The polyester resin for developing particles P1, P2 used above are those prepared as follows.

Polyester Resin for Developing Particles P1

Styrene and 2-ethylhexyl acrylate were mixed at a weight ratio of 17:3.2. The mixture was placed into a dropping funnel together with dicumyl peroxide serving as a polymerization initiator. A 4-necked glass flask equipped with a thermometer, a stirrer, a flow-type condenser and a nitrogen inlet tube was charged with polyoxypropylene (2,2)-2,2-bis(4-hydroxyphenyl)propane, polyoxyethylene(2,2)-2,2-bis(4-hydroxyphenyl)propane, isododecenylsuccinic anhydride, terephthalic acid, 1,2,4-benzene tricarboxylic anhydride and acrylic acid at a weight ratio of 42:11:11:11:8:1 together with dibutyltin oxide serving as a polymerization initiator. The mixture was stirred in a mantle heater at 135° C. in a nitrogen atmosphere, while styrene and others were dropped through a dropping funnel. Thereafter the obtained mixture was heated to 230° C. for reaction. The obtained polyester resin was found to have a softening point of 150° C. Polyester resin for developing particles P2

A 4-necked glass flask equipped with a thermometer, a stirrer, a flow-type condenser and a nitrogen inlet tube was charged with polyoxypropylene(2,2)-2,2-bis(4-hydroxyphenyl)propane, polyoxyethylene(2,2)-2,2-bis(4-hydroxyphenyl)propane, isododecenylsuccinic anhydride, terephthalic acid and fumaric acid at a weight ratio of 82:77:16:32:30 together with dibutyltin oxide serving as a polymerization initiator. The mixture was reacted with stirring in a mantle heater at 220° C. in a nitrogen atmosphere. The obtained polyester resin was found to have a softening point of 110° C.

(Measurement of Softening Point of Resin)

The softening point of a resin was measured by a flow tester (CFT-500, trade name, product of Shimadzu Seisakusho, Ltd.) and is a temperature corresponding to a 50% height from a flow starting point to a flow finishing point when a sample of 1 cm$^2$ was melted at and flowed from a die having a bore of 1 mm in diameter and 1 mm in length under a pressure of 20 kg/cm$^2$ and a temperature-elevating rate of 6° C./min.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for producing a reversible image display medium, which comprises two substrates opposed to each other with a predetermined gap therebetween; one or more developer-accommodating cells formed between the two substrates, each having a periphery surrounded by a partition wall; and a dry developer contained in each of the cell(s), wherein the dry developer contains at least two kinds of frictionally chargeable dry developing particles having different chargeable polarities and different optical reflection densities, the method comprising the steps of:

forming a resin-molded substrate having one surface which is projected and dented and which includes concavities for forming the developer-accommodating cells for producing a resin-molded substrate;

accommodating the dry developer into the concavities on the one surface of the resin-molded substrate formed at the resin-molded substrate forming step and employed as one of the two substrates of the image display medium; and fixing another substrate to the one surface of the resin-molded substrate formed at the resin molded substrate forming step with an adhesive composed of the same kind of resin material as that of the resin layer providing the one surface of the resin-molded substrate;

wherein the resin-molded substrate forming step comprises the step of:

forming an initial resin substrate by laminating a plurality of resin layers; and heating and pressing the one surface of the initial resin substrate by a molding die to provide the projected and dented surface, wherein the heating and pressing operation is carried out in a manner such that substantially no deformation occurs on the resin layer providing the surface opposed to the one surface of the initial resin substrate, wherein the molding die includes a plurality of the transfer rollers stepwise arranged in a passing direction of the initial resin substrate and opposed to a press roller with a gap therebetween, the transfer rollers have an irregular peripheral surface with projected portions and dented portions for molding the one surface of the initial resin substrate into the projected and dented surface, and the resin-molded substrate is formed by passing the initial resin substrate through the gap between the transfer rollers and the press roller, respectively, and the heating and pressing operation is repeated a plurality of times to give the resin-molded substrate.

2. The method of according to claim 1, wherein the plurality of transfer rollers have the same irregular peripheral surface having projected portions and dented portions.

3. The method according to claim 1, wherein the irregular peripheral surfaces having projected portions and dented portions of the transfer rollers vary stepwise in the passing direction of the initial resin substrate.

4. The method according to claim 3, wherein the irregular peripheral surfaces having projected portions and dented portions of the transfer rollers vary stepwise in an inclination angle of two side walls in the dented portions with respect to a plane vertical to a central axis of the rollers.

5. The method according to claim 4, wherein the inclination angle is gradually decreased from the upstream transfer roller to the downstream transfer roller in the passing direction of the initial resin substrate.

* * * * *

UNITED STATES PATENT AND TRADEMARK OFFICE
CERTIFICATE OF CORRECTION

PATENT NO. : 7,604,706 B2 Page 1 of 1
APPLICATION NO. : 10/109553
DATED : October 20, 2009
INVENTOR(S) : Otokawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 360 days.

Signed and Sealed this

Fifth Day of October, 2010

David J. Kappos
*Director of the United States Patent and Trademark Office*